(12) United States Patent
Simmons

(10) Patent No.: US 10,040,149 B2
(45) Date of Patent: *Aug. 7, 2018

(54) ASSEMBLY, KIT AND METHOD FOR SECURING A COVERING TO AN AIR INTAKE FACE

(71) Applicant: The Newway Company, Inc., Commerce Township, MI (US)

(72) Inventor: Randy Simmons, West Chester, OH (US)

(73) Assignee: The Newway Company, Inc., Commerce Township, MI (US)

( * ) Notice: Subject to any disclaimer, the term of this patent is extended or adjusted under 35 U.S.C. 154(b) by 16 days.

This patent is subject to a terminal disclaimer.

(21) Appl. No.: 14/930,728

(22) Filed: Nov. 3, 2015

(65) Prior Publication Data
US 2016/0052095 A1    Feb. 25, 2016

Related U.S. Application Data

(63) Continuation-in-part of application No. 14/841,433, filed on Aug. 31, 2015, now Pat. No. 9,561,456,
(Continued)

(51) Int. Cl.
*B23P 19/04* (2006.01)
*B01D 46/00* (2006.01)
(Continued)

(52) U.S. Cl.
CPC .......... *B23P 19/04* (2013.01); *B01D 46/0005* (2013.01); *B01D 46/0026* (2013.01);
(Continued)

(58) Field of Classification Search
CPC .............. B01D 46/0005; B01D 46/001; B01D 46/0026; B01D 46/10; B01D 2265/02;
(Continued)

(56) References Cited

U.S. PATENT DOCUMENTS 2,960,734 A    11/1960    Collins
3,866,380 A    2/1975    Benson
(Continued)

OTHER PUBLICATIONS

International Serarch Report, PCT/US2012/065314—dated May 15, 2013 6 pages.
(Continued)

*Primary Examiner* — Christopher M Koehler
*Assistant Examiner* — Joel Crandall
(74) *Attorney, Agent, or Firm* — Dinsmore & Shohl LLP

(57) ABSTRACT

An assembly for installing a covering over an air intake opening in engagement with a surrounding perimeter extending face. A plurality of elongated supports attached to the perimeter extending face at locations around the intake opening, each of the supports exhibiting a forwardly projecting support surface within which is configured a slot. A plurality of fasteners install through an accessible end location of each support such that a base of each fastener is retained within and traversable along an interior channel defined in said support, a projecting portion of each fastener extending from said base and through said slot. A rigid mesh exhibits a generally rectangular outline which generally matches the arrangement of the elongated supports, an aperture pattern defined in the mesh permitting the projecting portions of the fasteners to extend through the mesh to retain the mesh over the forwardly projecting support surfaces. The covering has a flexible material with perimeter defined apertures for receiving the projecting fastener portions to affix the material against an exterior surface of the mesh in engagement with the perimeter extending supports and to extend over the intake opening.

21 Claims, 29 Drawing Sheets

Related U.S. Application Data which is a continuation-in-part of application No. 13/296,616, filed on Nov. 15, 2011, which is a continuation-in-part of application No. 13/205,908, filed on Aug. 9, 2011.

(51) Int. Cl.

| | | |
|---|---|---|
| E06B 9/01 | (2006.01) | |
| E06B 9/24 | (2006.01) | |
| E06B 9/52 | (2006.01) | |
| F24F 13/08 | (2006.01) | |
| F16B 5/06 | (2006.01) | |
| F16B 5/12 | (2006.01) | |
| F16B 11/00 | (2006.01) | |
| F16B 1/00 | (2006.01) | |
| B01D 46/10 | (2006.01) | |
| F16B 7/04 | (2006.01) | |
| F16B 37/16 | (2006.01) | |

(52) U.S. Cl.
CPC ............... *E06B 9/01* (2013.01); *E06B 9/24* (2013.01); *E06B 9/52* (2013.01); *F16B 5/0692* (2013.01); *F16B 5/123* (2013.01); *F24F 13/082* (2013.01); *F24F 13/084* (2013.01); *B01D 46/10* (2013.01); *B01D 2265/02* (2013.01); *E06B 2009/015* (2013.01); *E06B 2009/527* (2013.01); *F16B 7/0413* (2013.01); *F16B 7/0426* (2013.01); *F16B 11/006* (2013.01); *F16B 37/16* (2013.01); *F16B 2001/0035* (2013.01)

(58) Field of Classification Search
CPC ... B23P 19/04; E06B 9/01; E06B 9/24; E06B 9/52; E06B 2009/015; E06B 2009/527; F16B 11/006; F16B 2001/0035; F16B 5/0692; F16B 5/123; F16B 7/0413; F16B 7/0426; F16B 37/16
USPC ........................................................ 29/281.5
See application file for complete search history.

(56) References Cited

U.S. PATENT DOCUMENTS

| | | | | |
|---|---|---|---|---|
| 3,950,157 | A * | 4/1976 | Matney | B01D 39/1676 244/53 B |
| 3,955,702 | A * | 5/1976 | Lundy | F21S 8/088 220/4.28 |
| 4,079,558 | A | 3/1978 | Gorham | |
| 4,387,541 | A | 6/1983 | Boomershine | |
| 4,409,758 | A * | 10/1983 | Dickerson | E06B 3/28 160/231.2 |
| 4,441,290 | A | 4/1984 | Abell | |
| 4,452,138 | A | 6/1984 | Bubley et al. | |
| 4,465,499 | A | 8/1984 | Wawro et al. | |
| 4,600,419 | A * | 7/1986 | Mattison | B01D 46/001 55/484 |
| 4,684,381 | A * | 8/1987 | Wasylyniuk | B01D 53/0407 454/158 |
| 4,745,769 | A | 5/1988 | Wooden, Jr. | |
| 4,909,004 | A | 3/1990 | Panttila | |
| 4,971,130 | A | 11/1990 | Bentley | |
| 5,131,188 | A | 7/1992 | Hutchison et al. | |
| 5,141,046 | A | 8/1992 | Duncan | |
| 5,370,722 | A | 12/1994 | Simmons | |
| 5,399,180 | A | 3/1995 | Kopp | |
| 5,547,011 | A * | 8/1996 | Dotson | E06B 9/24 160/371 |
| 5,809,800 | A | 9/1998 | Deal | |
| 5,873,999 | A * | 2/1999 | Gaiser | B01D 29/012 210/488 |
| 5,899,027 | A | 5/1999 | St. Louis | |
| 5,941,031 | A * | 8/1999 | Fullwood | E06B 3/00 52/202 |
| 5,964,910 | A * | 10/1999 | Keele | B01D 46/0004 55/385.1 |
| 6,197,077 | B1 * | 3/2001 | Simmons | B01D 46/10 55/351 |
| 6,264,713 | B1 | 7/2001 | Lewis, II | |
| 6,334,881 | B1 | 1/2002 | Giannetta et al. | |
| 6,349,522 | B1 | 2/2002 | Stevens | |
| 6,361,578 | B1 * | 3/2002 | Rubinson | B01D 46/0004 55/487 |
| 6,393,777 | B1 | 5/2002 | Renfrow | |
| 6,406,508 | B1 | 6/2002 | Bloomer | |
| 6,430,954 | B1 * | 8/2002 | Smith | F24F 1/58 135/913 |
| 6,464,745 | B2 | 10/2002 | Rivera et al. | |
| 6,532,702 | B1 | 3/2003 | Scribner | |
| 6,623,203 | B2 | 9/2003 | Kreyenborg et al. | |
| 6,623,540 | B2 * | 9/2003 | Clayton | B01D 46/0005 55/480 |
| 6,793,715 | B1 | 9/2004 | Sandberg | |
| 6,918,940 | B1 | 7/2005 | Lackey et al. | |
| 6,959,748 | B2 | 11/2005 | Hudoba | |
| 6,974,622 | B2 | 12/2005 | Wade | |
| 6,978,579 | B1 * | 12/2005 | Trinca | E06B 9/02 49/50 |
| 7,062,884 | B2 * | 6/2006 | Jaycox | E06B 9/04 292/297 |
| 7,210,513 | B2 * | 5/2007 | Goldenberg | E06B 9/54 160/296 |
| 7,323,028 | B2 * | 1/2008 | Simmons | B01D 46/0005 55/351 |
| 7,387,654 | B1 | 6/2008 | Byers | |
| 7,416,577 | B2 | 8/2008 | Simmons | |
| 7,604,127 | B2 | 10/2009 | Freissle et al. | |
| 7,842,116 | B2 * | 11/2010 | Simmons | B01D 46/0005 55/480 |
| 7,896,941 | B2 | 3/2011 | Choi | |
| 8,074,408 | B1 | 12/2011 | Motosko et al. | |
| 9,561,456 | B2 * | 2/2017 | Simmons | E06B 9/01 |
| 2003/0134091 | A1 * | 7/2003 | Wade | E04C 2/20 428/182 |
| 2003/0221380 | A1 | 12/2003 | Kreps et al. | |
| 2004/0154242 | A1 | 8/2004 | Hudoba et al. | |
| 2005/0055905 | A1 * | 3/2005 | Sayer | B01L 1/50 52/204.1 |
| 2005/0279065 | A1 * | 12/2005 | Simmons | B01D 46/0005 55/495 |
| 2006/0010792 | A1 * | 1/2006 | Biggers | E06B 9/02 52/202 |
| 2007/0101666 | A1 | 5/2007 | Munch | |
| 2007/0107328 | A1 * | 5/2007 | Munch | E06B 9/02 52/202 |
| 2007/0204533 | A1 | 9/2007 | Gower | |
| 2009/0014371 | A1 * | 1/2009 | Cook | B01D 29/01 210/164 |
| 2010/0146881 | A1 * | 6/2010 | Framer | E06B 9/02 52/202 |
| 2016/0052095 | A1 * | 2/2016 | Simmons | B01D 46/0005 29/281.5 |

OTHER PUBLICATIONS

StayPut Fasteners, Horizontal, Vertical & Canvas to Canvas, 1 Page, Stayput Fasteners Australia, www.stayputfasteners.com.au, info@stayputfasteners.com.au , Australian Canvas and Synthethic Products Association, no date available.
www.permatron.com/air-intak-solutions/hailstop-hail-guard, HailStop Hail Guard Netting, Six pages, Aug. 30, 2016.
2015 Permatron Corporation, Hail Stop, Hail Guard Netting, 3 pages.

\* cited by examiner

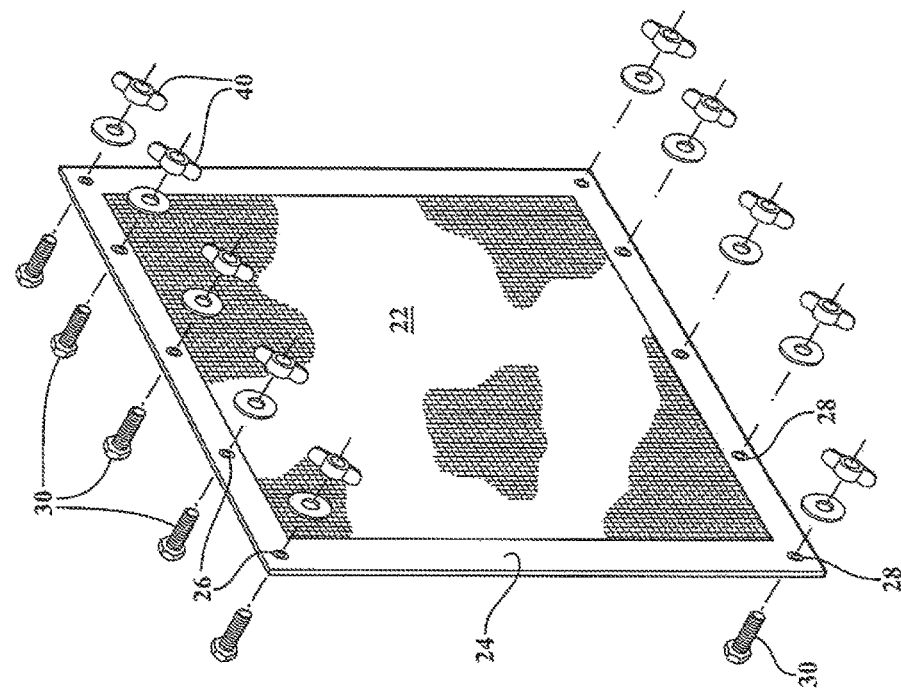
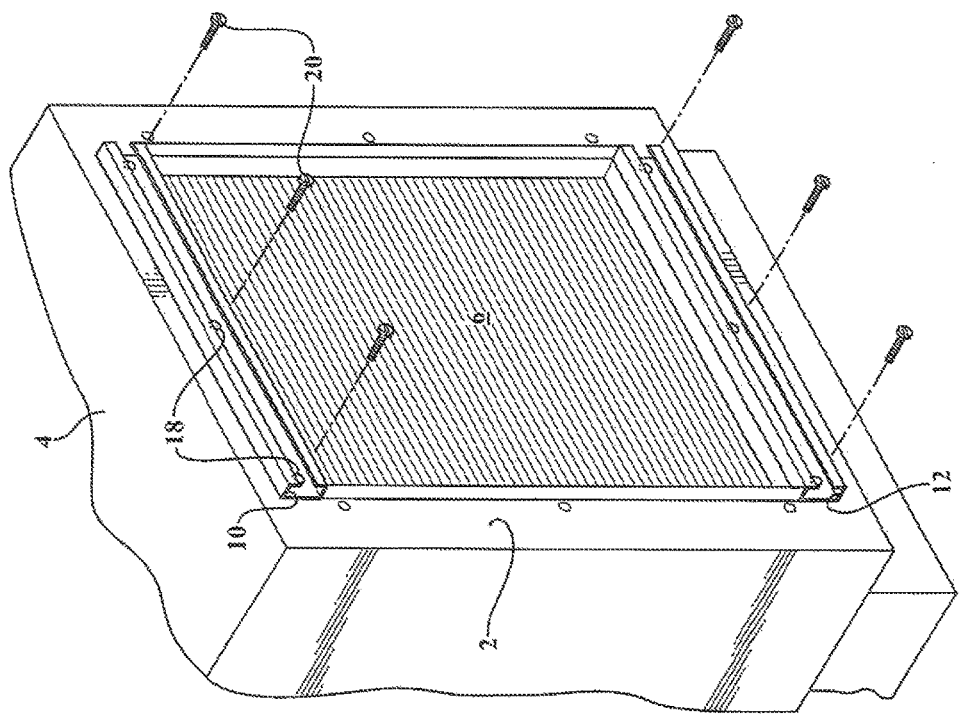
FIG. 1

FIG. 2
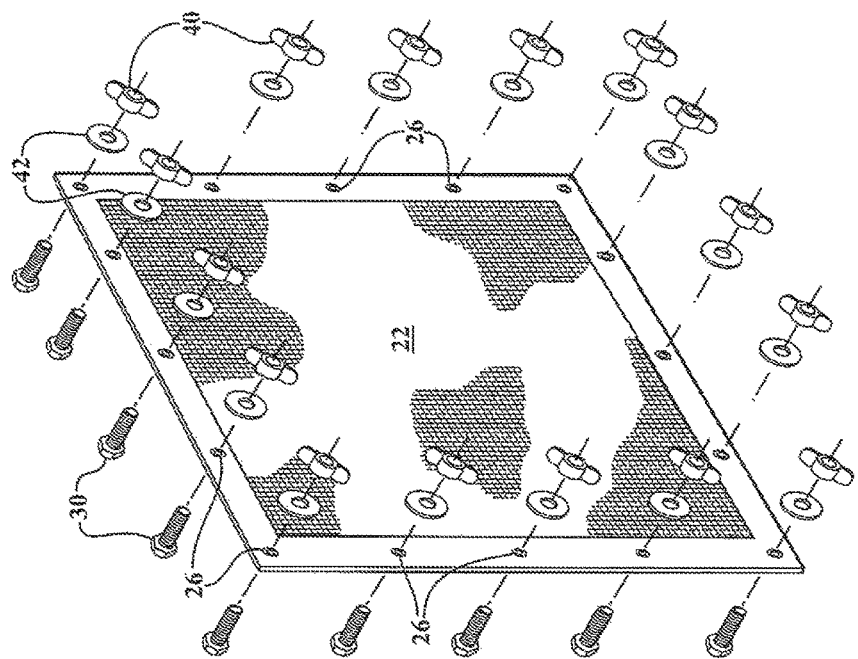
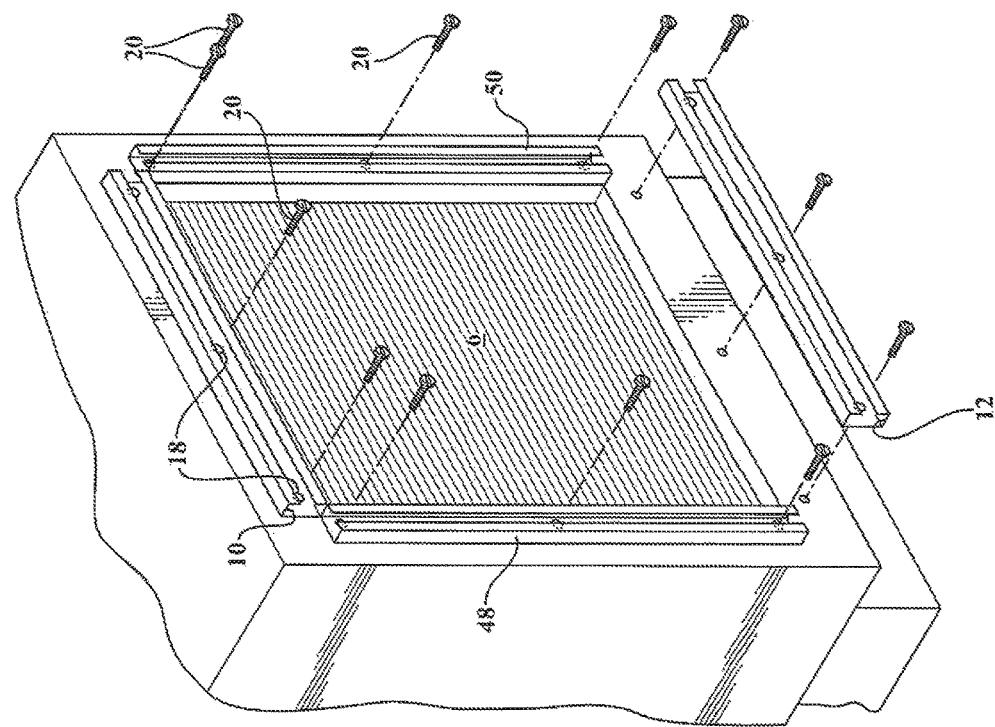

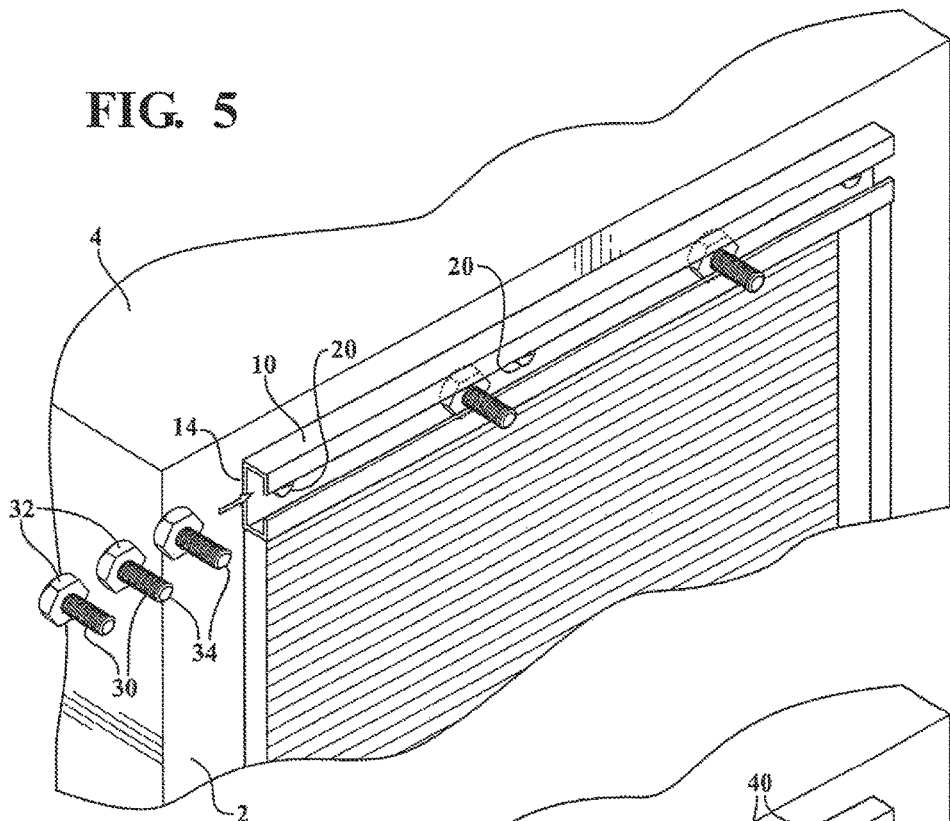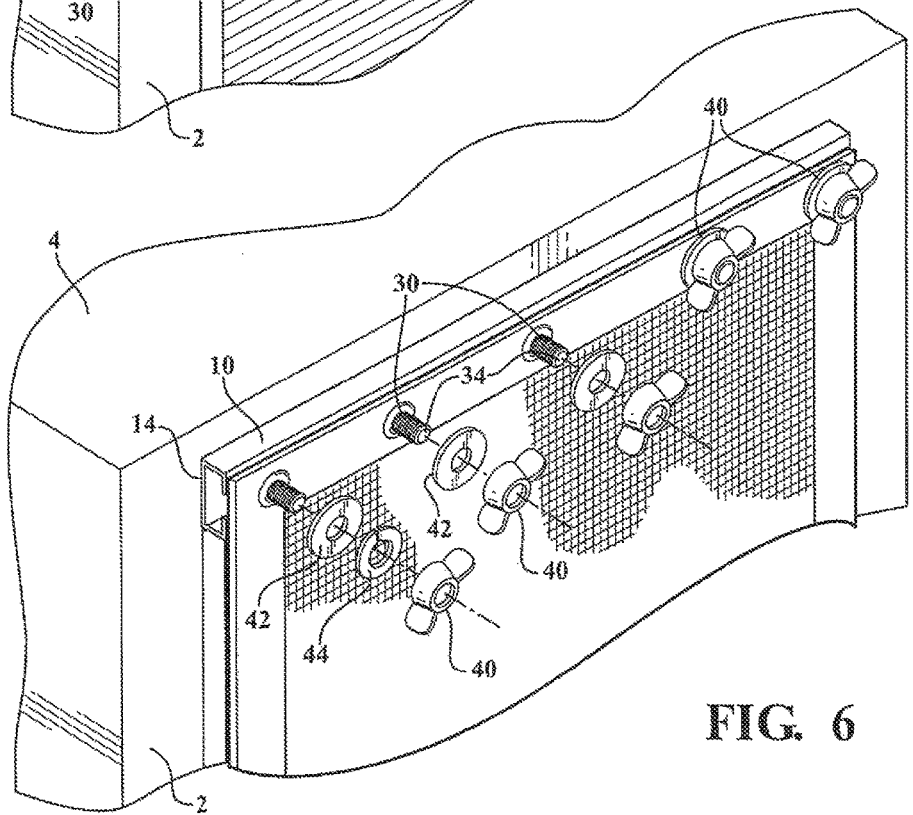

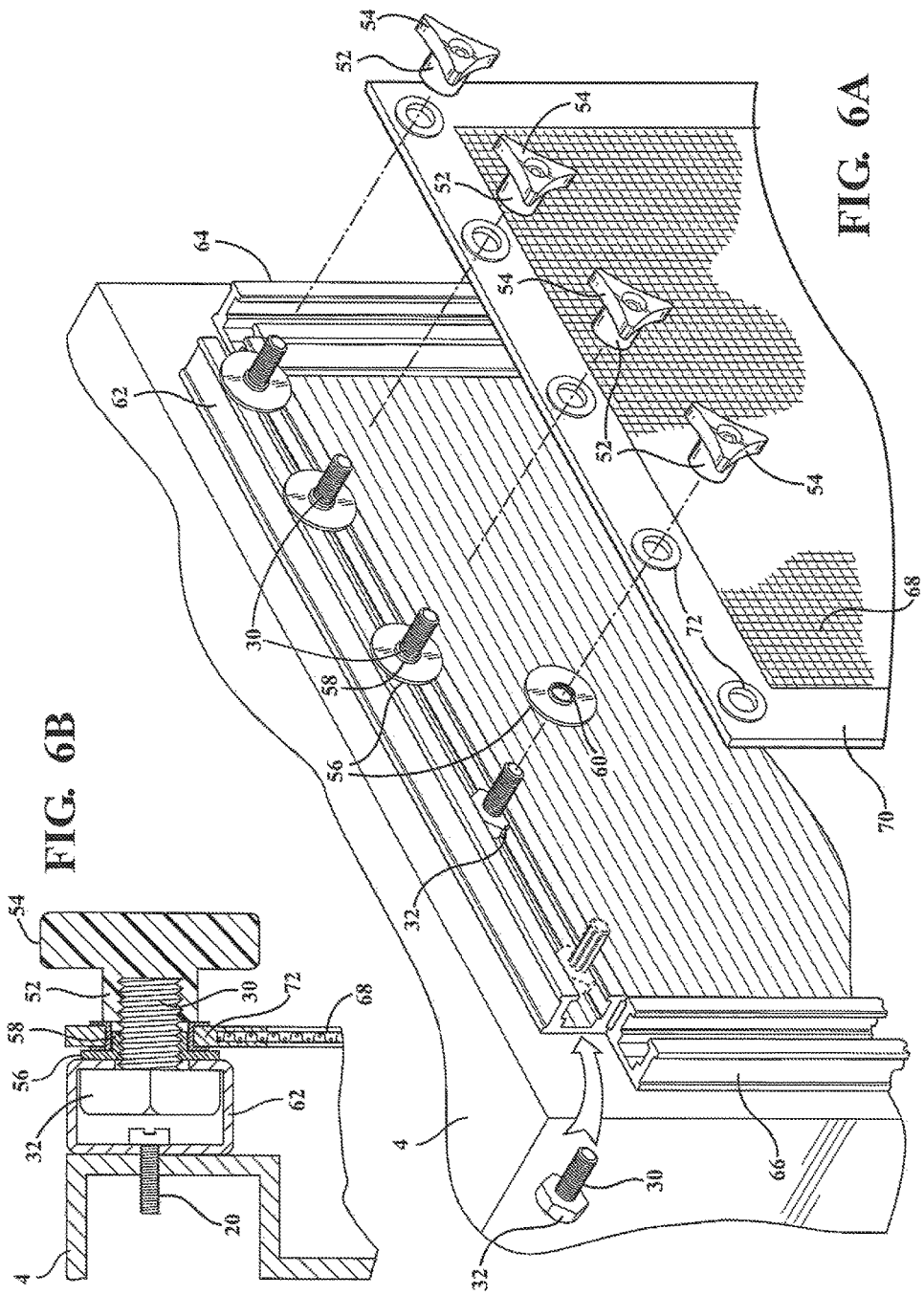

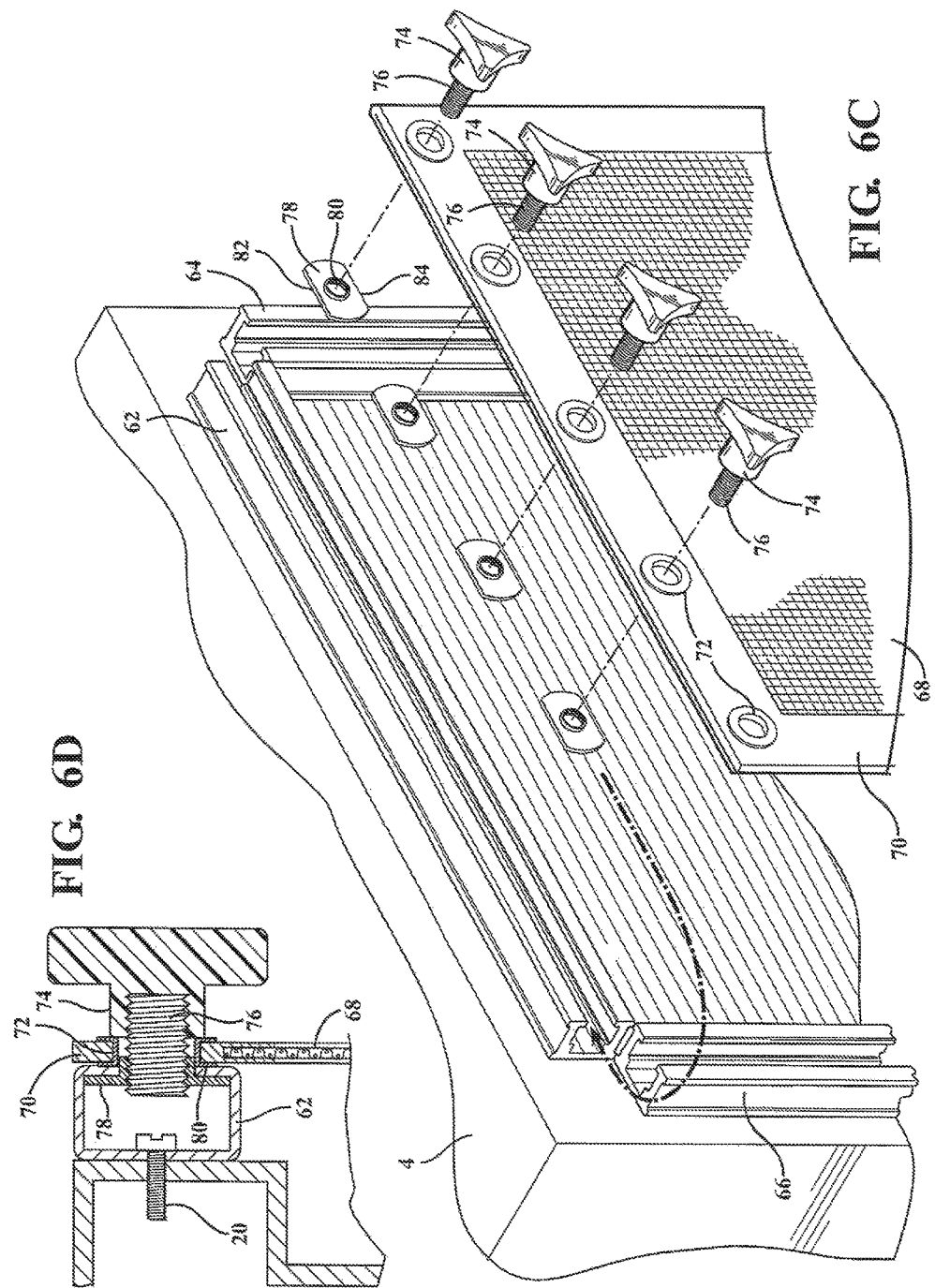

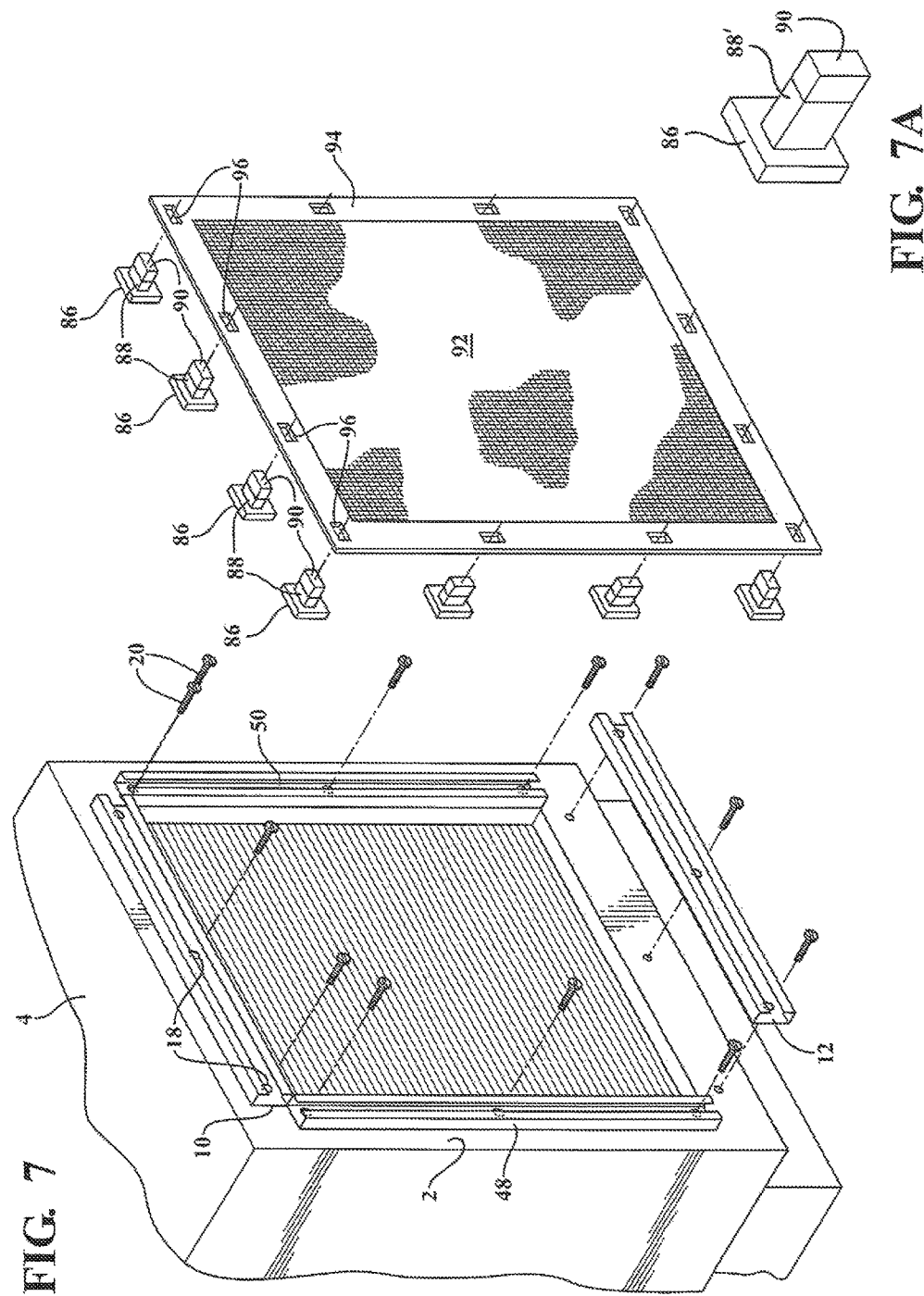

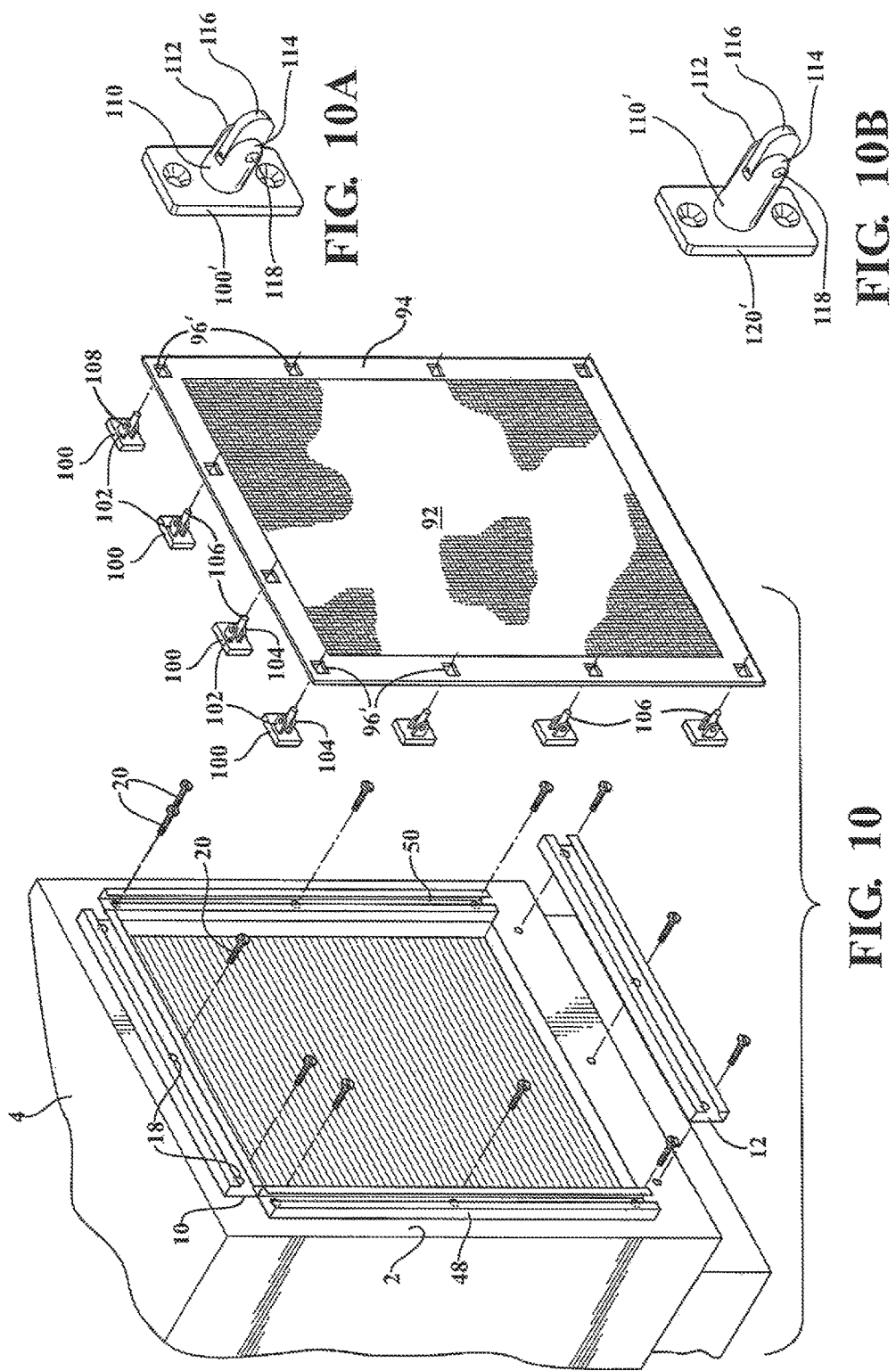

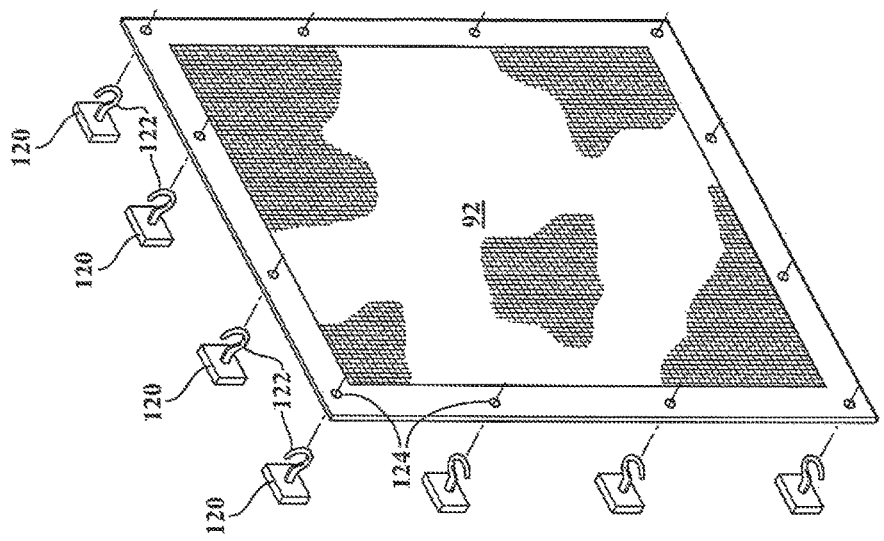
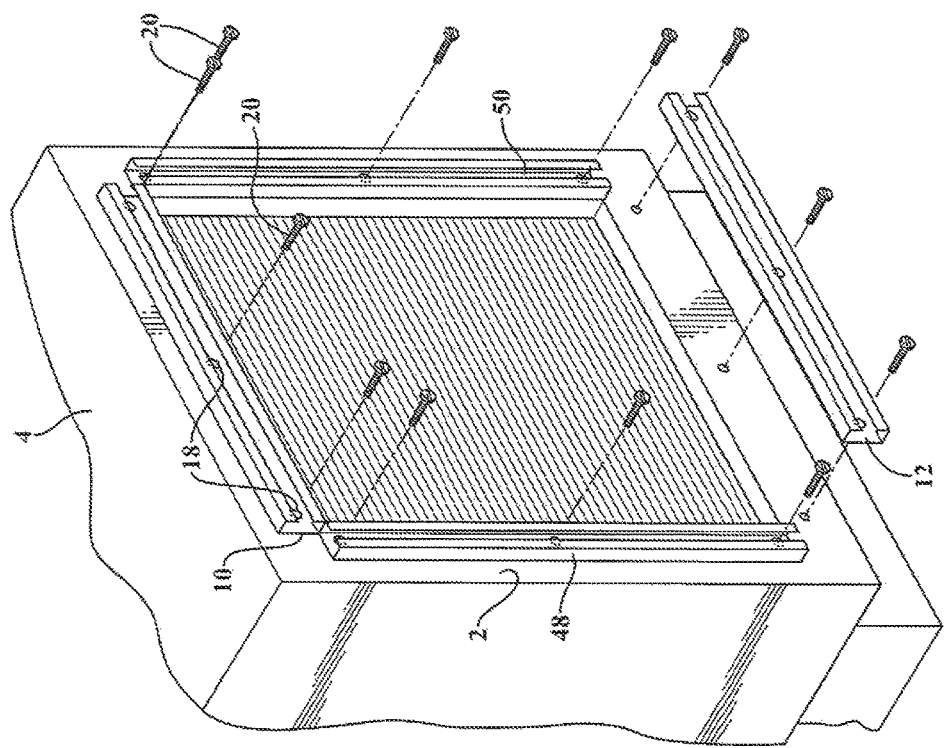
FIG. 13

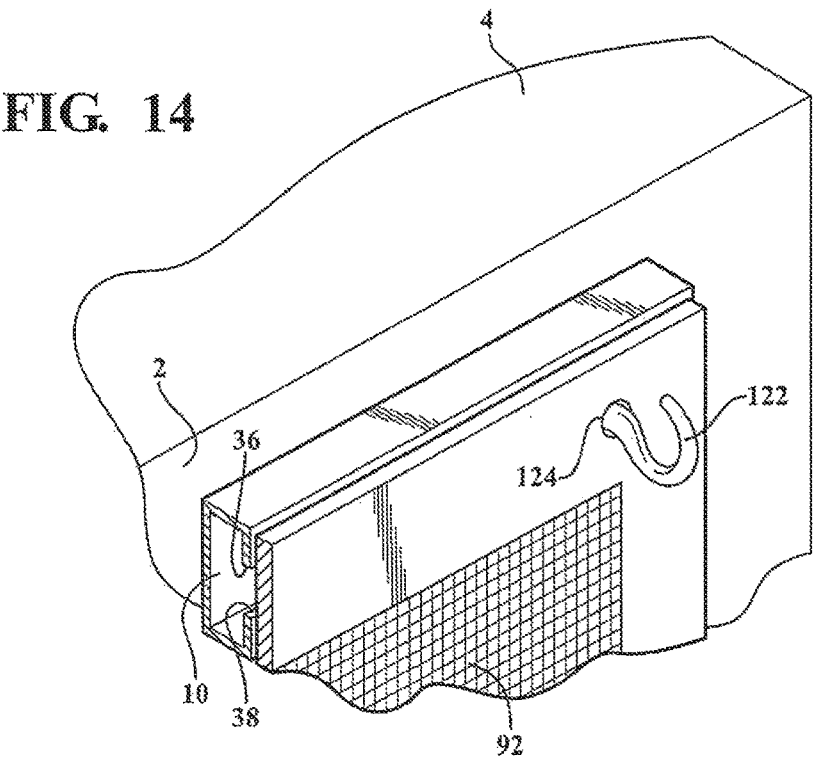
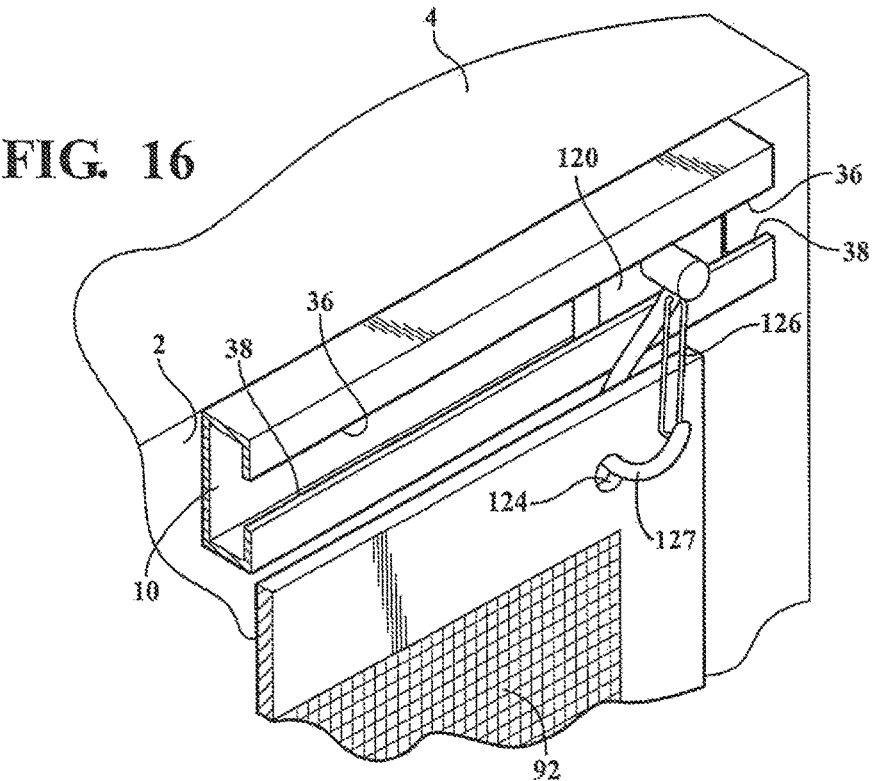

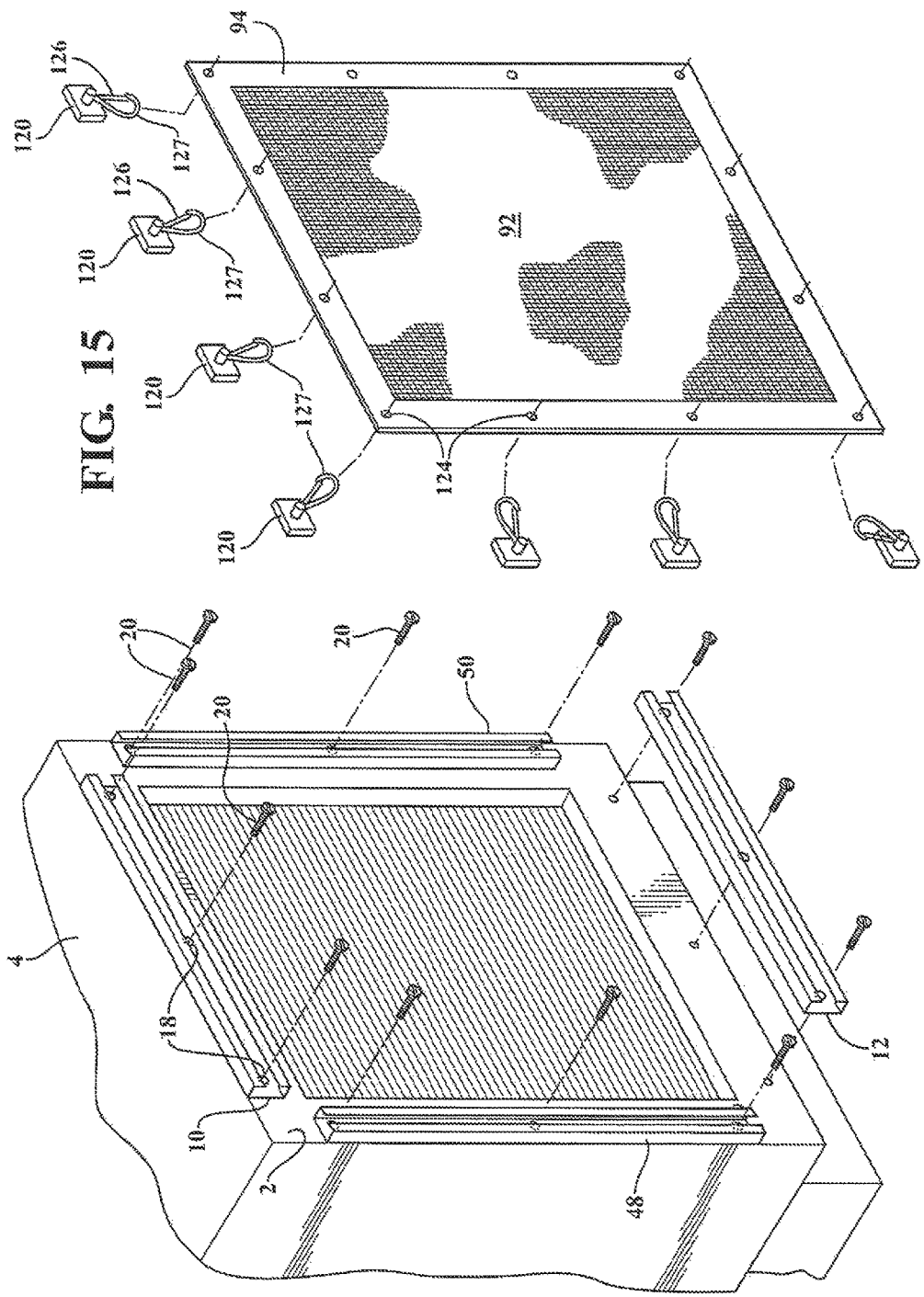

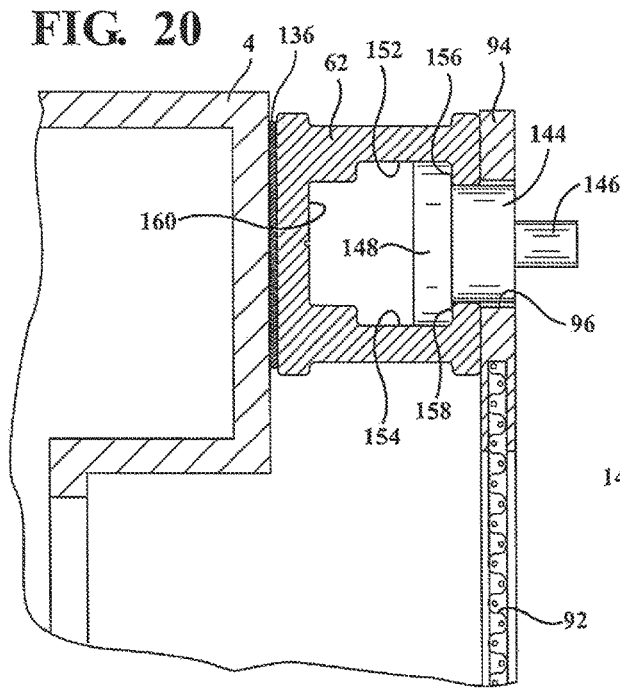
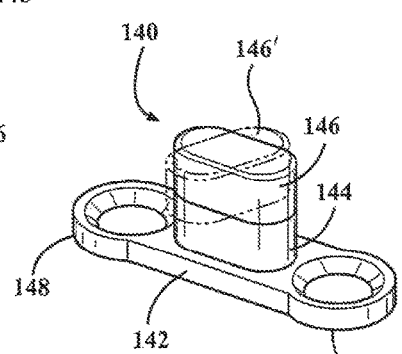
FIG. 20
FIG. 21
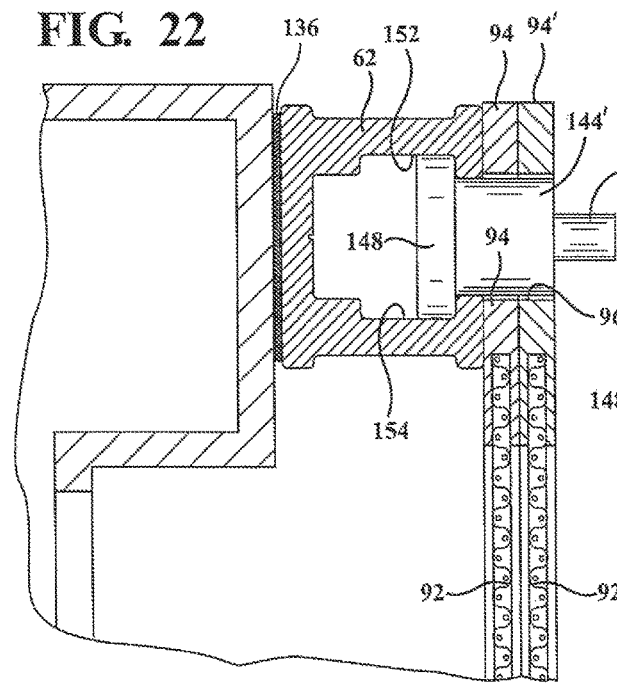
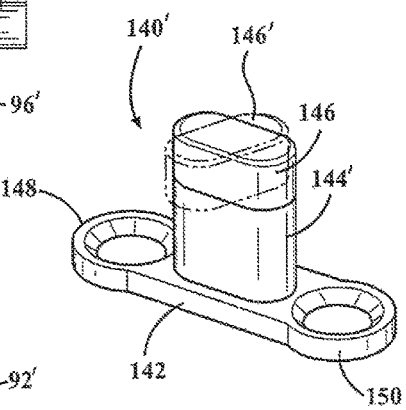
FIG. 22
FIG. 23

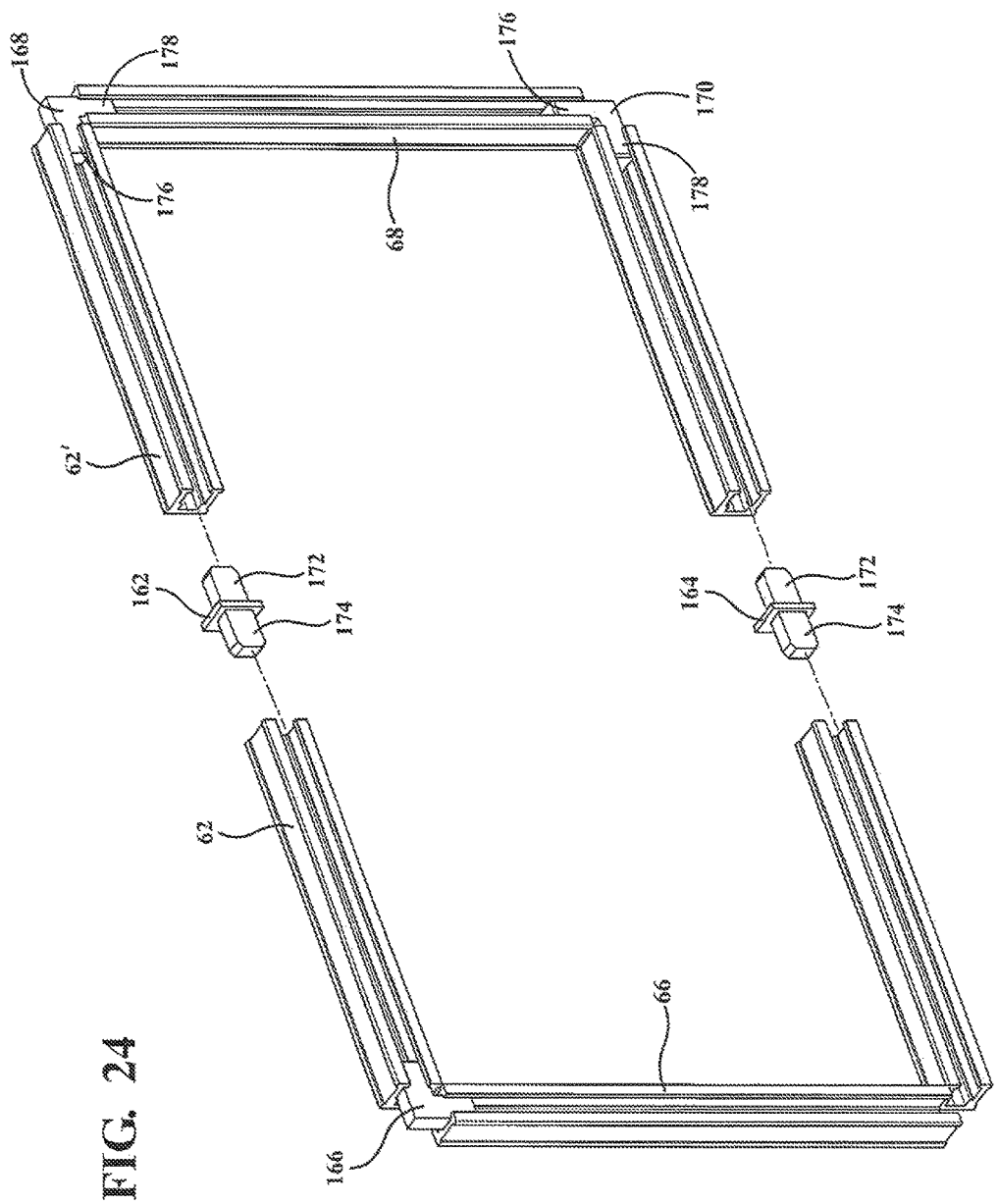

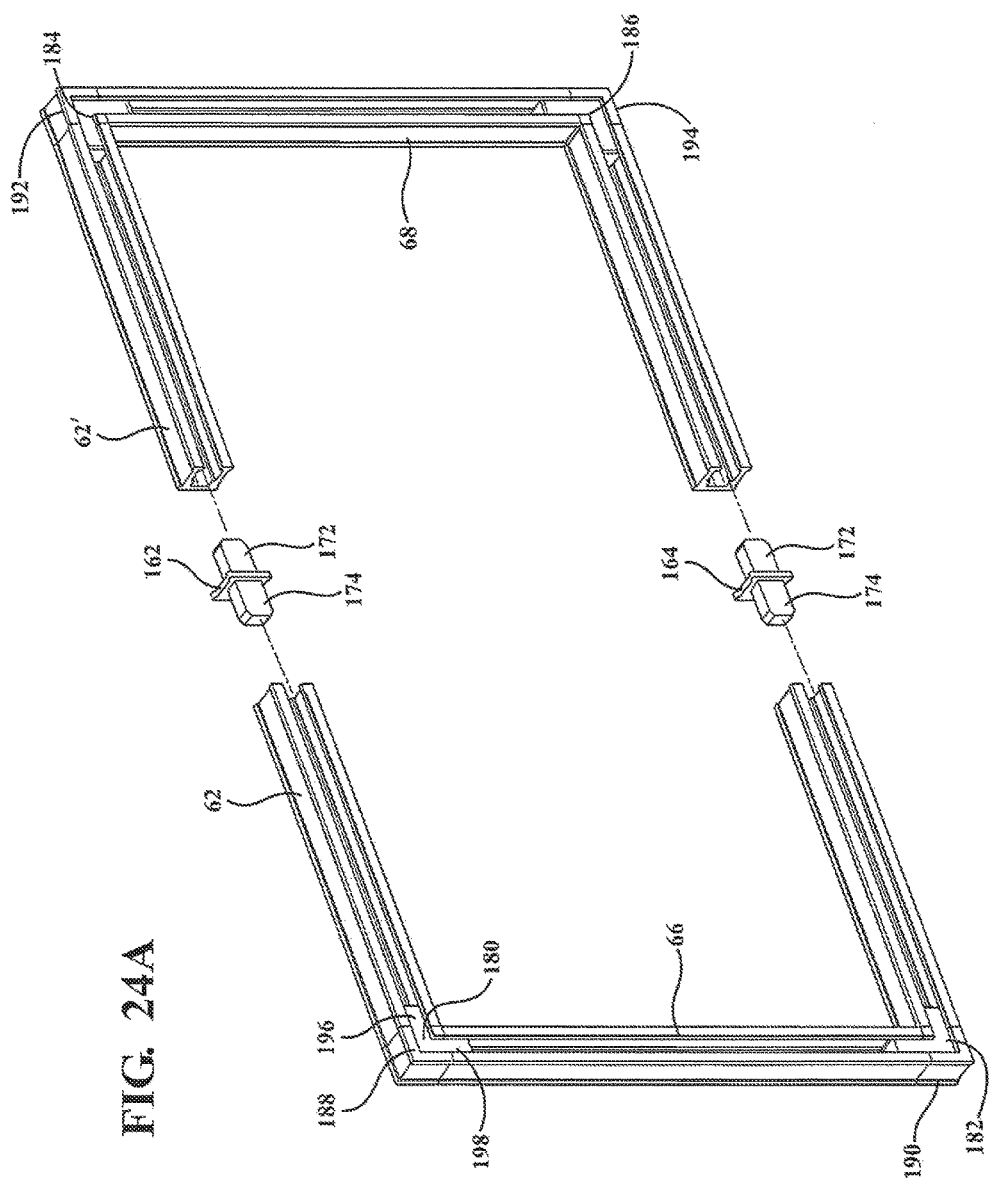

FIG. 24B
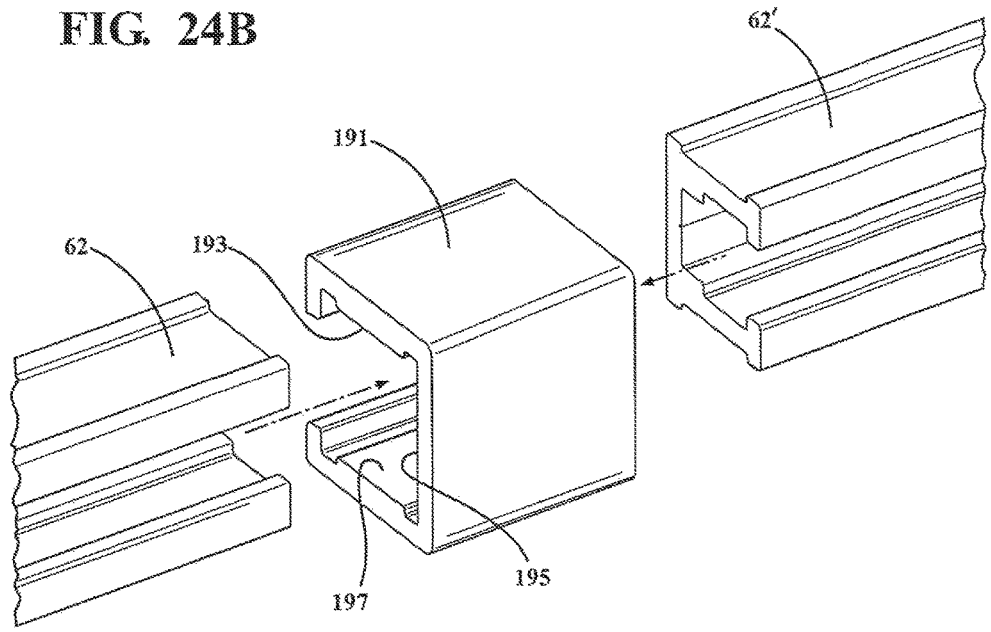
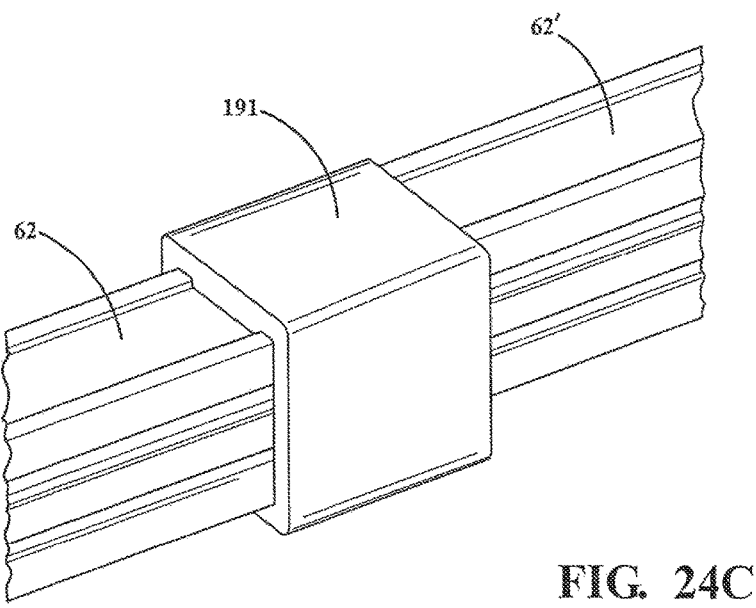
FIG. 24C

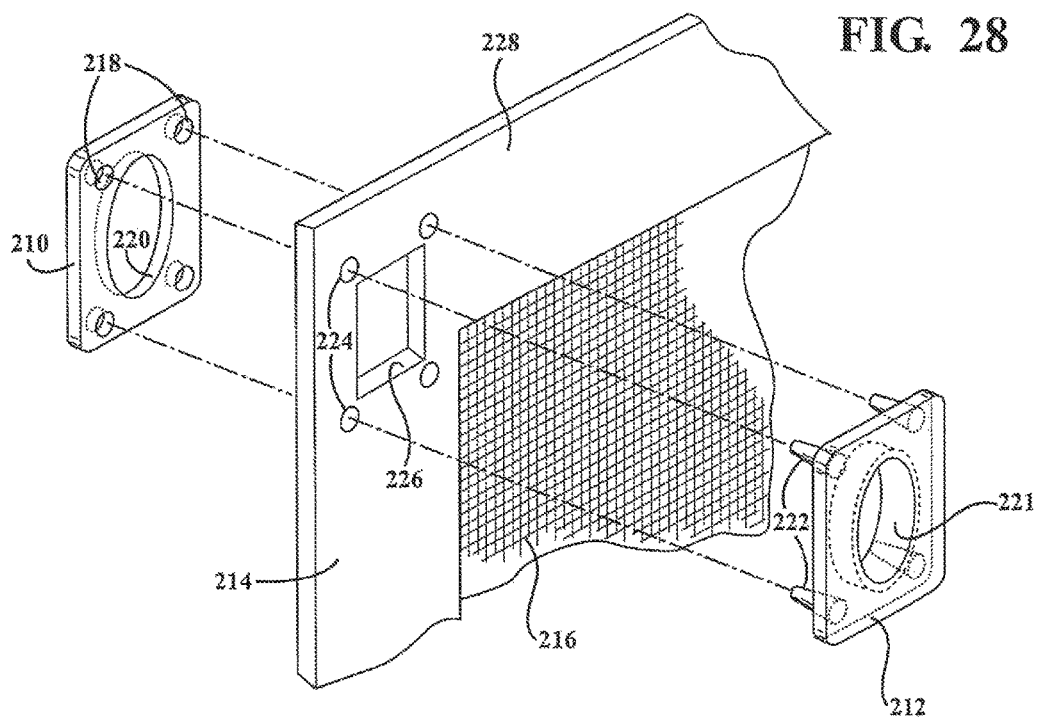
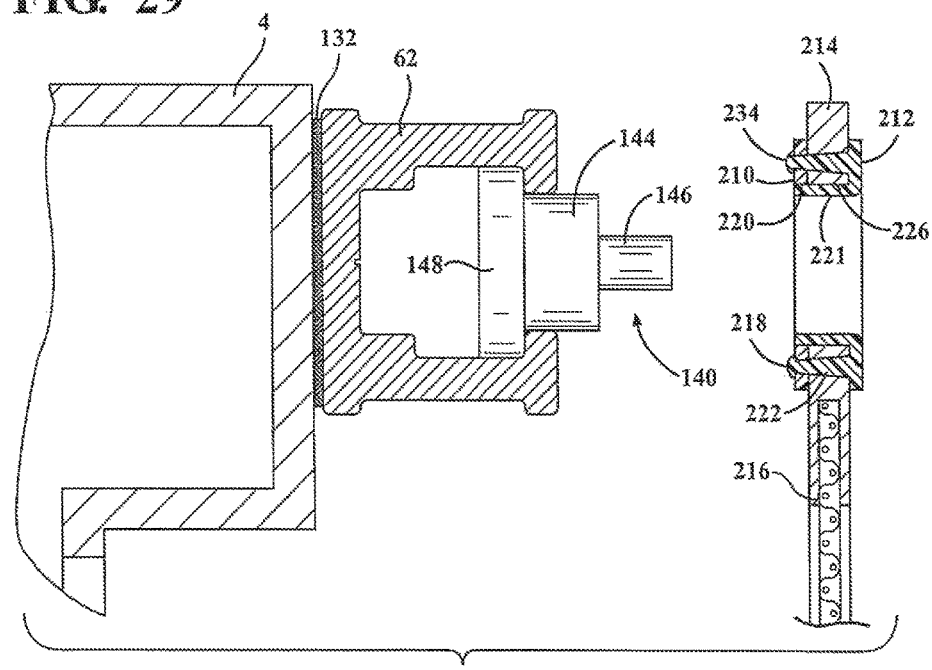

ASSEMBLY, KIT AND METHOD FOR SECURING A COVERING TO AN AIR INTAKE FACE

CROSS-REFERENCE TO RELATED APPLICATIONS

This application is a continuation in part of U.S. Ser. No. 14/841,433 filed Aug. 31, 2015, application Ser. No. 14/841,433 is a continuation in part of application Ser. No. 13/296,616 filed on Nov. 15, 2011. application Ser. No. 13/296,616 is a Continuation-in-part of application Ser. No. 13/205,908 filed on Aug. 9, 2011.

FIELD OF THE INVENTION

The present invention is directed to an assembly for securing any of a filter screen or other covering (clear or opaque) to a perimeter extending face surrounding a central opening of an air intake structure, such as further including but not limited to any piece of conventional HVAC equipment. A plurality of elongated and interior channel or track defining supports are permanently or releasably secured to the intake face and, in combination with any type of fastener position-ally secured along the track defined support, secures the perimeter edge of the screen or covering over the arranged supports and central opening. In a further variant, a rigid lattice style mesh is provided and is positioned between the filter and the track defining supports (kit) in order to provide additional protection to the intake face and surrounding opening, as well as protecting the overlaid filter, such as against tearing in response to the striking of objects during windy conditions and the like.

BACKGROUND OF THE INVENTION

Filter screen assemblies, such as utilized for covering an intake opening associated with an air handling unit, are known. Such screens are usually either affixed to the surrounding fascia extending around a perimeter of the intake opening, suspended from a curtain rod extending over the opening, or secured in some other fashion. Examples drawn from the prior art include such as U.S. Pat. No. 7,323,028, U.S. Pat. No. 7,842,116, U.S. Pat. No. 7,416,577, and U.S. Pat. No. 5,370,722, all to Simmons.

Wade, U.S. Pat. No. 6,974,622 recites both a method and a related track mounting and alignment kit for installing a rigid covering to a perimeter extending face surrounding a window opening so that a gap exists between the edges of the covering and the associated mounting tracks. Referring to FIGS. 4 and 5, the kit and assembly may utilize mounting tracks mounted to opposite sides (two only) of an opening, the mounting tracks being mounted along the top or bottom or along the lateral sides of the opening (window) utilizing any suitable fastener. The covering in Wade can be secure to the track utilizing a wing nut or other key type fastener.

SUMMARY OF THE INVENTION

The present inventions disclose an assembly/system, kit and related method for either permanently or releasably securing any combination of elongated supports to a perimeter defining face associated with an air intake. The elongated supports each include a modified "U" cross sectional shaped rail which is initially secured, such as via magnets, adhesive tape or fasteners, in a generally parallel extending fashion proximate to the fascia defined edges of an air intake structure opening.

A plurality of fasteners are provided and which are slidably installed through inner defined channels of the elongated supports, from end accessible locations thereof. The configuration of the fasteners are such that they can include enlarged hex heads or any other base configuration which does not rotate within the internal defined channels or pivot out through a forwardly facing and narrowed slot or opening through which the remaining portion of the fastener (threaded shafts, twist or toggle lock, hooks, clips, etc.) are permitted to project.

The attachable filter screen is particularly sized for use with a given frame configuration of pre-mounted rails and exhibits either of a naked (non-reinforced) or reinforced perimeter within which is configured a plurality of edge extending apertures and/or grommets, through which projects the extending portion of the desired fastener upon the screen being applied over the centrally defined intake opening. The screen can also include any covering (clear, opaque or otherwise) not limited to filtration. Yet additional variants contemplate the application of this technology to window, doorway (i.e. such as standard and larger garage door type entranceways) or any other suitable opening which it is desirous to cover in the manner described herein.

In a further variant, a rigid lattice style mesh is provided and is positioned between the filter and the track defining supports (kit), this in order to provide additional protection to the intake face and surrounding opening, as well as protecting the overlaid filter, such as against tearing in response to the striking of objects during windy conditions and the like. The rigid mesh can include any of a metal, plastic coated metal or rigid nylon molded material, the rectangular outline of which generally matches the dimensions of the multi-sided track mount kit and which permits the bolt fastener threads or other projecting engagement portion extending from the track to projecting beyond edge proximate locations of the mesh for receiving the aperture edge proximate locations of the filter or other suitable covering.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is an exploded view of the assembly according to a first embodiment of the present invention and exhibiting a single pair of upper and lower horizontal extending and fascia supporting rails to which a filter screen is secured by the associated bolt fasteners;

FIG. 2 is a view similar to FIG. 1 of a system according to a second embodiment with first horizontal and second vertical pairs of intake face mounted rails;

FIG. 5 is a perspective illustration of an initial pre-assembly step including the installation of a plurality of bolt head fasteners into the modified "U" shaped and fascia attachable rails with threaded shafts projecting through an outwardly facing narrowed slot;

FIG. 6 is a succeeding assembly stage to FIG. 5 in which the perimeter edge extending filter screen grommets are seated upon the projecting shafts and at which the washers and wing nuts are attached;

FIG. 6A is a partially exploded perspective of a modification of the assembly of FIG. 6 and showing an arrangement of twist caps in use with the fasteners of FIG. 5;

FIG. 6B is a partial plan cutaway of a selected engagement established between a bolt, twist cap and modified washer with threaded interior collar against first and second surfaces of the filter screen or other supported covering;

FIG. 6C is a view similar to FIG. 6A of a related variant in which a modification of the outer twist cap integrates a threaded bolt, the bolt fasteners of FIG. 6A being removed and substituted by a reconfigured washer with threaded central support collar which is repositioned within the track following intermediate assembly with the twist cap and interposed filter;

FIG. 6D is a partial plan cutaway of a selected engagement established between the modified screw cap and track insertable washer of FIG. 6C against first and second surfaces of the filter screen or other supported covering;

FIG. 7 is an exploded illustration similar to FIG. 2 of a further embodiment incorporating a plurality of reconfigured and channel rail mounted twist lock fasteners;

FIG. 7A is an enlarged perspective of a modified twist lock fastener exhibiting a lengthened fixed support portion for accommodating any of thicker filter screens, multiple layer screens, or other coverings;

FIG. 10 is another exploded illustration similar to FIG. 7 of a yet further embodiment incorporation a plurality of reconfigured and channel rail mounted toggle lock fasteners;

FIG. 10A is a perspective of a variant of a toggle lock fastener;

FIG. 10B is a perspective of a further variant of a toggle lock fastener exhibiting a lengthened fixed support portion for accommodating any of thicker filter screens, multiple layer screens, or other coverings;

FIG. 13 is an exploded illustration of a yet further embodiment incorporating a plurality of reconfigured and channel rail mounted hook fasteners;

FIG. 14 is an enlarged, assembled and corner perspective of the embodiment of FIG. 13 and illustrating a selected corner located hook supporting fastener in an engaged position relative to an outer receiving location of the outer covering;

FIG. 15 is an exploded illustration of a yet further embodiment incorporating a plurality of reconfigured and carabiner type fasteners;

FIG. 16 is an enlarged, assembled and corner perspective of the embodiment of FIG. 15 and illustrating a selected corner located carabiner supporting fastener in an engaged position relative to an outer receiving location of the outer covering;

FIG. 20 is a cross sectional cutaway of a selected track support from FIG. 19 and illustrating an underside positioned magnet for assisting in releasably securing the support in extending fashion along a metal receiving surface of the intake face;

FIG. 21 is an illustration of a selected twist lock fastener utilized in the engagement protocol of FIG. 20 and exhibiting widened base support locations for facilitating frictional and positional fitting within the interior track defining sides of the support;

FIG. 22 is a cross sectional cutaway of a selected track support as previously shown in FIG. 20 and illustrating a variant of the twist lock fastener;

FIG. 23 is an illustration of the modified twist lock fastener, similar to that shown in FIG. 21, and exhibiting a lengthened fixed support portion for accommodating any of thicker filter screens, multiple layer screens, or other coverings;

FIG. 24 is a partially exploded view of a support track according to a modification of FIG. 19 and which includes the provision of intermediate end-to-end and corner/angled adaptors or plugs for assembling running lengths of support track in varying arrangements upon the air intake face;

FIG. 24A is a similar illustration to FIG. 24 and showing a variant of the corner adaptors/plugs for providing the assembled support track with a seamless edge appearance;

FIGS. 24B-24C respectively illustrated exploded and assembled views of a further three sided variant of linear end-to-end adaptor which is configured to attached abutting opposing ends of first and second selected running lengths of support tack;

FIG. 28 is an illustration of a further variant of screen attached grommet in the form of a two-piece sandwich configuration for inter-engaging through opposite sides of a reinforced corner location of an associated screen;

FIG. 29 is a further partially exploded plan view of the assembled screen grommet of FIG. 28 in combination with the toggle lock fastener of FIGS. 20-21;

DETAILED DESCRIPTION OF THE PREFERRED EMBODIMENTS

Figure 3:
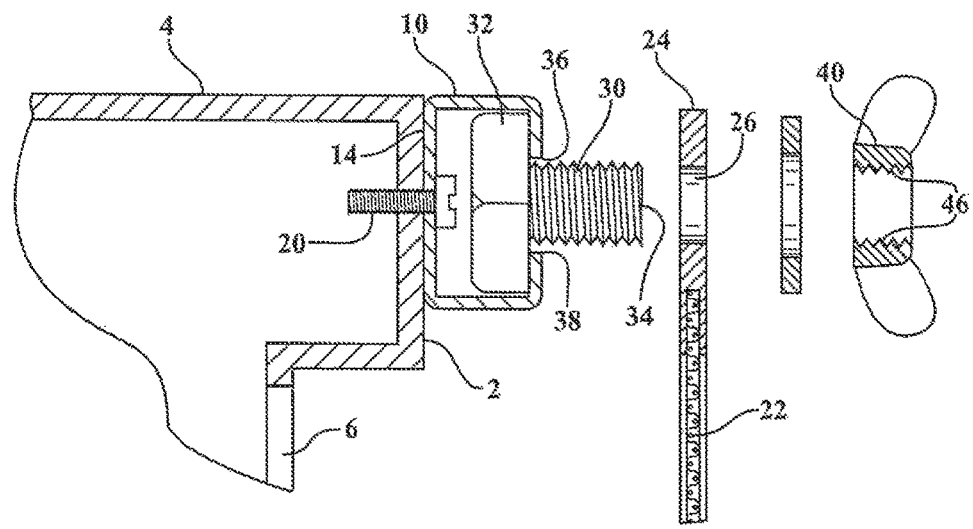
FIG. 3 is a side cutaway view in exploded fashion of a pre-assembly location of a selected bolt fastener, rail location, screen with reinforced edge located grommet, washer and wing nut.

As will be further described with reference to the succeeding illustrations, the present invention discloses a system/assembly, kit and method of assembling a plurality of track supports with to a surrounding fascia associated with an air intake opening, these in combination with a variety of screens/coverings, fasteners for supporting the screen on the assembled supports, and optional end-to-end and corner adaptors/plugs for arranging the track supports according to any desired orientation. As will be explained in further detail, the present invention enables attachment of any number of the support tracks to the face of air handling mechanical equipment, this including the use of magnets to accomplish releasable attachment of the elongated supports to the surface of the air intake face. Other variants contemplate any of adhesives, including two sided tape or glue, as well as conventional fasteners (screws, bolts, etc.) for securing the track supports to the intake face.

Referring to FIG. 1, an exploded view is generally depicted of the channel lock filter fastening system according to a first embodiment of the present invention and exhibiting a single pair of upper and lower horizontal extending and fascia supporting rails, see at 10 and 12, which are secured at extending locations along a fascia surface 2 associated with an air intake structure 4 (such further understood to include any suitable type of air handling mechanical equipment not limited to air conditioner condenser units, cooling towers etc.). As further depicted in each of succeeding views FIGS. 3-6, each of the rails (see for example first upper horizontal extending rail 10) exhibits a three dimensional, and typically modified "U", shape with a base surface (see at 14 in each of FIGS. 3-6).

A plurality of spaced apart apertures are defined by inner perimeter extending circular edges 18 (see again rail 10 in each of FIGS. 1 and 2). A plurality of screw fasteners 20 are provided and insert through the circular apertures in order to fasten the rails 10 and 12 in horizontal and parallel extending fashion above and below an intake opening or area which is further generally designated at 6 in each of FIGS. 1-4.

A filter screen 22 is provided, typically exhibiting a flexible mesh like material and including a surrounding reinforced outer portion 24. First 26 and second 28 pluralities of grommets (such interpreted to include metal ringlets or the like which are molded, press fit or otherwise affixed), extend along top and bottom outer hem extending locations of the reinforced outer portion 24.

A plurality of bolt fasteners 30 are provided and are identical in construction as with the various edge extending grommets or screw fasteners. As best shown in FIGS. 3-6, an enlarged head 32 (typically hexagonal shaped) is dimensioned so that it establishes a minor degree of clearance with the inner extending edges of the associated channel defined in the selected rail 10. This facilitates the bolts 30 to be successively installed through an open accessible end of the rail 10 (see FIG. 5) and traversable along the channel interior to desired intermediate locations, and with an end 34 of each bolt shaft projecting beyond a slot (see walls 36 and 38 in partially exploded view of FIG. 3) defined in a forward spaced projecting edge of the rail.

Figure 4:
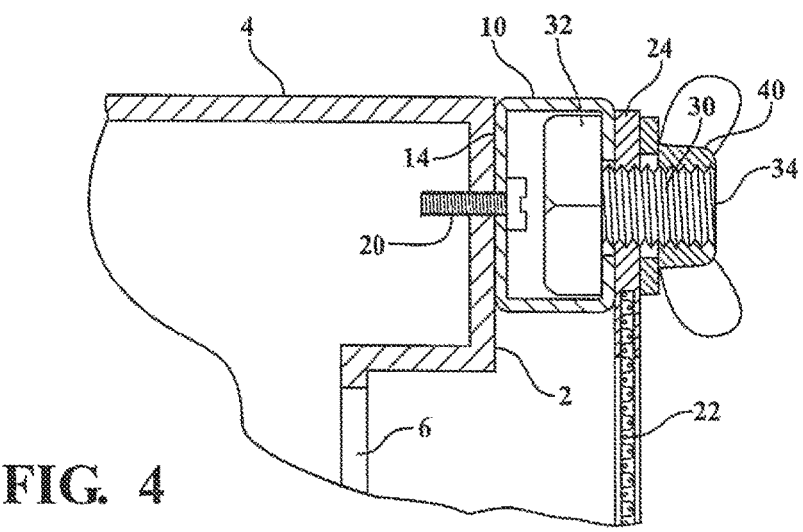
FIG. 4 is a succeeding assembly location of the components depicted in FIG. 3.

At this point, and viewing FIGS. 1, 4 and 6 collectively, the filter screen 22 is applied such that the ringlets 26 are successively seated over the projecting shaft ends 34, following which a plurality of nuts, by non-limiting example depicted as wing nuts 40, are applied over the exposed shaft ends and are rotated into a tightening arrangement in order to secure the filter screen to the rails 10 and 12. Also depicted are a plurality of washers 42 (see FIG. 6) this also contemplating the additional or alternate use of lock washers (further at 44 in FIG. 6) and so as to prevent the filter from becoming inadvertently loosened from the intake structure fascia.

Alternative to separately provided washers/lock washers, it is also envisioned that suitable washer/lock washer portions can be integrally formed into the wing nut (or other nut) construction. It is further envisioned that, referring to FIG. 3, a suitable nylon coating 46 can be applied to the inner threads associated with each wing nut 40 and which can be accomplished both in combination or alternate the incorporation of any type of separately utilized or integrally formed lock washers. It is further understood that the configuration and dimensioning of the enlarged bolt heads is such that, during twisting application of the nuts 40, the heads 32 do not turn or rotate within the channels (see again FIGS. 3 and 4), such otherwise impeding the ability to quickly apply or remove the nuts 40.

FIG. 2 is a view similar to FIG. 1 of a system according to a second embodiment which differs only to the extent that it adds a second vertical pair of intake face mounted rails 48 and 50 applied to opposite and vertically extending sides of the fascia 2 in such a fashion that the first (10 and 12) and second pairs (48 and 50) of rails collectively establish a generally rectangular shape (this including a square shape in the instance in which the sides of the intake opening and the lengths of all the rails are co-equal). Otherwise, the filter 22 is as previously disclosed in claim 1 with the corresponding modification to include additional grommets 26 likewise extending along the vertical side edges of the reinforced outer frame (also hem or skirt) with corresponding additional bolts 30, wing nuts 40 and washers 42 likewise being provided so as to progressively secure the filter 22 along each of four interconnecting edges and as opposed to only two upper and lower edges as is the case in the illustration of FIG. 1. Such an assembly option as depicted in FIG. 2 contemplates, without limitation, that the bolts, nuts and washers associated with the upper rail 10 are first assembled, following which the sides 48 and 50 are progressively assembled such as further by individually supporting the bolts within the vertical channels during progressive assembly of the nuts and washers. That said, the present invention does not preclude or limit any particular assembly protocol or sequence beyond that which is possible owing to the structural aspects of the design.

Referring now to FIG. 6A, a partially exploded perspective of a modification of the assembly of FIG. 6 and showing an arrangement of twist caps 52 in use with the fasteners (threaded shafts 30 which are also termed "snug nuts" as well as an equal number of hex heads 32) of FIG. 5. The twist caps depict collars which are interiorly threaded from an open inner end (not shown) and further each include a triangular (or other suitable and polygonal) shaped gripping end 54. The caps 52 are further constructed of a plastic or other suitable material.

As additionally shown in FIG. 6B, an equal plurality of modified washers 56 are provided, each of these including a protuberant collar 58 defining an interiorly threaded profile 60. The bolts (hex head 32 and stem 30) are pre-installed into an open channel end defined in a modified support track (see at 62, 64 and 66 in FIG. 6 arranged about the intake opening of the associated structure 4) and so that the threaded stems 30 projecting through the front disposed slot in the manner depicted. The elongated track supports are similar in application to those previously disclosed at 10 and 12 in FIG. 1 and can include a slightly modified extrusion profile and, as will be further described, can be attached both to the face of intake structure and interconnected in end-to-end fashion according to a variety of different configurations.

A flexible ply material or covering, such as any screen or mesh utilized in a filtration application or an opaque covering in the instance of a sealing or winterizing application, is provided at 68. The material may include a reinforced outer perimeter 70 and can further exhibit a plurality of reinforced ringlets 72 (also termed grommets) integrated into the outer perimeter of the material. In application, and as again referenced in the partial plan cutaway of FIG. 6B, a selected engagement is established between a bolt, twist cap and modified washer with threaded interior collar against first and second surfaces of the filter screen or other supported covering 68.

FIG. 6C is a view similar to FIG. 6A of a related variant in which a modification of the outer twist cap, see at 74 in comparison to as shown at 52 in FIG. 6A) integrates a threaded bolt 76. The bolt fasteners of FIG. 6A are removed in this variant and substituted by a reconfigured washer 78 with threaded central support collar 80. The washers 78 each exhibit linear upper 82 and bottom 84 edges and are dimensioned such that they are insertable through the open end of the track supports 62, 64, 66, et seq.

In practice, and owing to the lack of a projecting component through the front defined and slot accessible face of each track support, the threaded portions 76 of the twist nuts 74 are typically pre-engaged through the material ringlets 72 and the inner threaded collars 80 of the modified/flattened washers in an intermediate assembled fashion, such prior to the washers being installed from the open channel ends of the supports. In this fashion, the twist nuts 74 are used for translating the washers within the supports prior to finished tightening. This is further depicted in FIG. 6D which, similar to FIG. 6B, is a partial plan cutaway of a selected engagement established between the modified screw cap and track insertable washer of FIG. 6C against first and second surfaces of the filter screen or other supported covering. As further shown, the linear edges 82/84 of the modified washers 78 can be dimensioned, if desired, such that they establish a desired friction engagement with the inside channel defining sides of the track supports 62, 64, 66, et seq., this in order to assist in maintaining their position within the supports during completion of installation.

Figure 8:
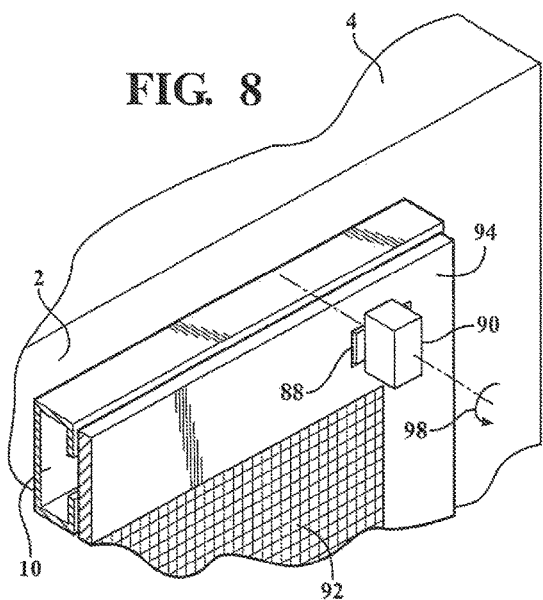
FIG. 8 is an enlarged, assembled and corner perspective of the embodiment of FIG. 7 and illustrating a selected corner located twist lock fastener in an engaged position relative to an outer receiving location of the outer covering.
Figure 9:
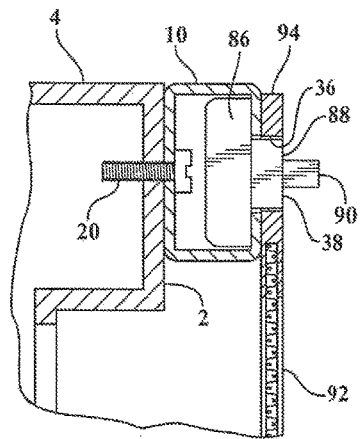
FIG. 9 is a side view corresponding to FIG. 4 in the preceding embodiment illustrating the configuration of the selected twist lock fastener of FIG. 8 in engagement with the screen.

Referring now to FIG. 7, an exploded illustration similar to FIG. 2 of a further embodiment incorporating a plurality of reconfigured and channel rail mounted twist lock fasteners, each of which including a flat rectangular shaped base 86 which is dimensioned for seating in laterally slidable fashion within the open channel interior defined in relation to each rail 10, 12, 48, 50 (as previously described in the preceding embodiments). The inserting base 86 in turn supports a reduced dimensioned fixed portion 88 which in turn seats through the linear slot defined between inner extending walls 36 and 38 (this as best shown in FIGS. 8 and 9 and such that the both the fixed portion 88 and underlying channel seating base 86 are permitted to slide but not rotate relative to the rails). FIG. 7A is an enlarged perspective of a modified twist lock fastener exhibiting a lengthened fixed support portion 88' extending from the base 86 and for accommodating any of thicker filter screens, multiple layer screens, or other coverings;

A further twist and lock portion 90 is mounted via a pin or stud in a rotatable fashion relative to the fixed support 88. A screen or like covering 92 exhibits a flexible or rigid perimeter extending edge 94 within which is defined an array of perimeter spaced apart rectangular apertures 96 (as opposed to circular apertures 28 depicted in the variant of FIG. 1). Without limitation, the apertures in the covering can also exhibit any other shape or profile.

In this fashion, and upon the twist lock portions being first rotated to a flush profile with the underlying fixed portions 88 (FIG. 7), the fasteners are prepositioned within the rails so that the twist lock portion 90 and the upper part of the underlying fixed portion 88 collectively seat through the apertures 96 (see FIG. 9). At this point, the twist lock portion 90 is rotated ninety degrees about a horizontal axis (see arrow 98 in FIG. 8) and so that an offset portion of the underside of each twist lock portion 88 prevents removal of the covering 92.

Figure 8A:
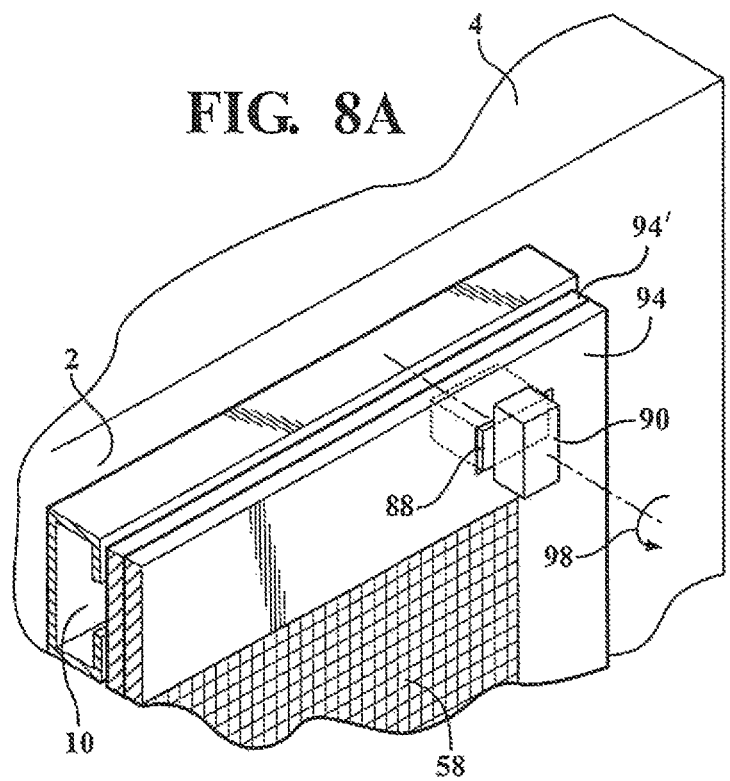
FIG. 8A is an illustration similar to FIG. 8 of a variant of the twist lock fastener for supporting a dual layer screen upon a selected elongated support track.
Figure 9A:
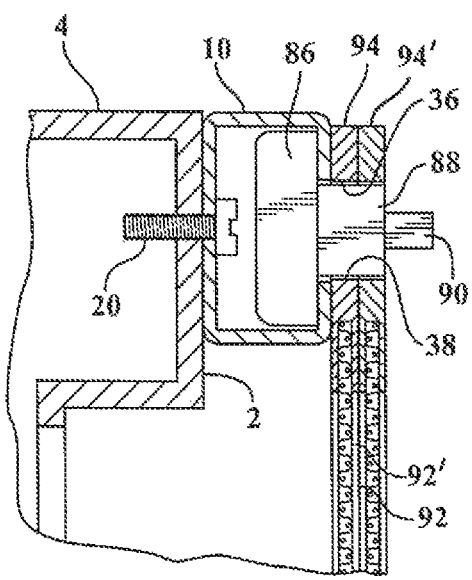
FIG. 9A is a corresponding side view of the twist lock fastener of FIG. 8A in engagement with the dual layer screen.

FIG. 8A is an illustration similar to FIG. 8 of a variant of the twist lock fastener for supporting a dual layer screen, see at 92 and 92' with corresponding reinforced edges 94 and 94', upon a selected elongated support track. FIG. 9A is a corresponding side view of the twist lock fastener of FIG. 8A in engagement with the dual layer screen 94/94'.

In this manner, the various fasteners are capable of being preposition along either or both of first and second opposing pairs of surface mounted rails 10/12 and/or 48/50 in a manner which facilitates quick location, installation and removal of the covering. The covering material 92 can again include any type of screen or mesh as well as also contemplating the use of impermeable covering or insulating materials. It is further envisioned that the outer perimeter or binding 94 of the covering material can include either rigid or flexible materials.

Figure 11:
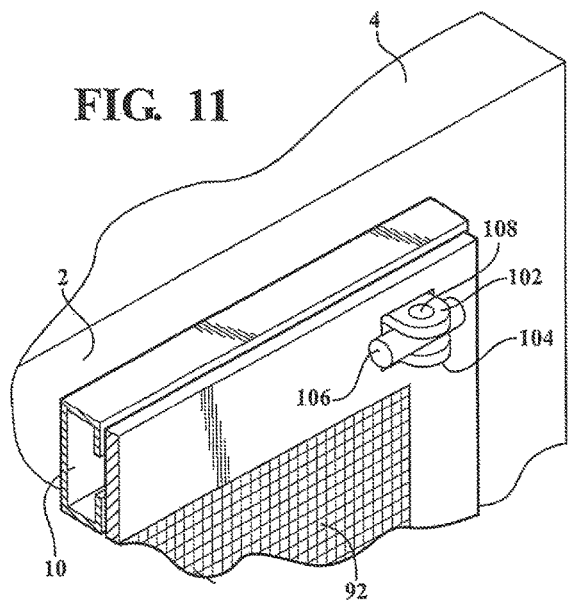
FIG. 11 corresponds to FIG. 8 and illustrates a selected corner located toggle lock fastener in engaged position relative to an outer receiving location of the outer covering.
Figure 12:
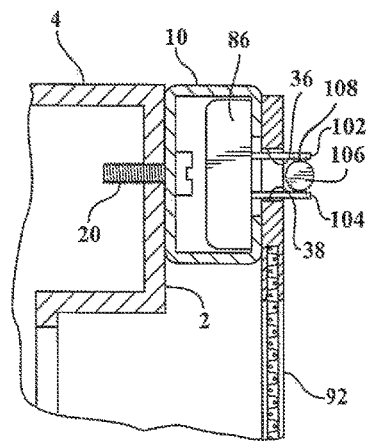
FIG. 12 corresponds to FIG. 9 and illustrates the configuration of the selected toggle lock fastener in engagement with a filter screen.

Referring to FIG. 10 in combination with FIGS. 11-12, another exploded illustration similar to FIG. 7 is provided of a yet further embodiment incorporating a plurality of reconfigured and channel rail mounted toggle lock fasteners. Each of the toggle lock fasteners includes a generally flat and rectangular shaped channel seating base 100 of a shape and dimension similar to that previously identified at 86 in regards to the twist lock fasteners of FIG. 7 and such that the toggle lock fasteners can be channel inserted for lateral displacement within the associated surface mounted rails 10/12 and 48/50 (see again FIG. 12) or at 62, 64, 66, et seq. (FIG. 6A).

Each of the toggle lock fasteners further includes a pair of spaced apart tabs 102 and 104 projecting from each base 100 in a manner which permit outermost portions thereof to project beyond the spaced apart channel defining surfaces 36 and 38 associated with each selected rail (and as shown in cutaway in FIG. 12 in relation to selected rail 10). A cylindrical shaped toggle element 106 is mounted about a vertical axis defined by a pin 108 extending widthwise through the toggle and supported to the tabs 102 and 104. In this fashion, the toggle lock fasteners are first pre-positioned within the channel rails 10, 12, 48 and 50, following a modified array of spaced apart apertures 96' associated with the flexible or rigid binding or perimeter 94 associated with the covering 92 are mounted over the toggle elements in the perpendicular extending positions shown in FIG. 10 relative to the support base 100, following which the toggle elements 106 are rotated to the position of FIGS. 11 and 12.

FIG. 10A illustrates one non-limited example of a substitutable modification of toggle lock fastener as compared to that described in FIG. 10 and in which a pseudo-cylindrical shaped post or body 110 extends from a reconfigured channel seating base 100' (this including such as dovetail apertures defined therein for receiving other types of mounting fasteners in other applications separate from sliding insertion within the rail channels as described herein). The generally cylindrical shaped body 110 is solid proximate its integral mounting location with the flat and rectangular shaped channel seating base 100' and includes a pair of extending ears or lobes 112 and 114, these in turn establishing an inner slot or channel having a desired profile for seating therebetween a generally planar, curved edged and rotatable toggle element 116 mounted for rotation between the ears or lobes 112 and 114 via a horizontal pin 118.

The toggle fastener depicted in FIG. 10A is both installed and manipulated in a substantially identical fashion as compared to that in FIG. 10 and it is further envisioned that other variations of either twist or toggle lock fasteners can be employed within the scope of the invention. FIG. 10B is a perspective of a further variant of a toggle lock fastener of FIG. 10A exhibiting a lengthened fixed support portion 110' for accommodating any of thicker filter screens, multiple layer screens, or other coverings, and such as is again reflected by the dual layer covering arrangement of FIGS. 8A and 9A.

FIG. 13 is an exploded illustration of a yet further embodiment incorporating a plurality of reconfigured and channel rail mounted hook fasteners including base shaped channel rail supports 120 from which project hook shaped elements 122. The covering material 92 exhibits a series of apertures 124 arranged in spaced apart fashion about an outer flexible or rigid perimeter of the covering, such further including reinforced ringlets or grommets (both plastic or metal) for preventing tearing of the binding, with the further understanding that suitable rectangular shaped outer reinforcements can also be integrated into the covering apertures 96 and 96' depicted respectively in FIGS. 7 and 10. FIG. 14 is an enlarged, assembled and corner perspective of the embodiment of FIG. 13 and illustrating a selected corner located hook supporting fastener 122 in an engaged position relative to an outer receiving location (aperture) 124 of the outer covering 92.

FIG. 15 is an exploded illustration of a yet further embodiment incorporating a plurality of reconfigured and carabiner type fasteners, these including once again insertable planar rectangular base supports 120 from which are pivotally supported individual and spring biasing carabiners 126. FIG. 16 is an enlarged, assembled and corner perspective of the embodiment of FIG. 15 and illustrating a selected corner located carabiner, see spring biased portion 126 pivotal relative to a hook main portion 127, and shown in an engaged position relative to an outer receiving aperture 124 of the reinforced outer covering 94 of the material 92.

Figure 17:
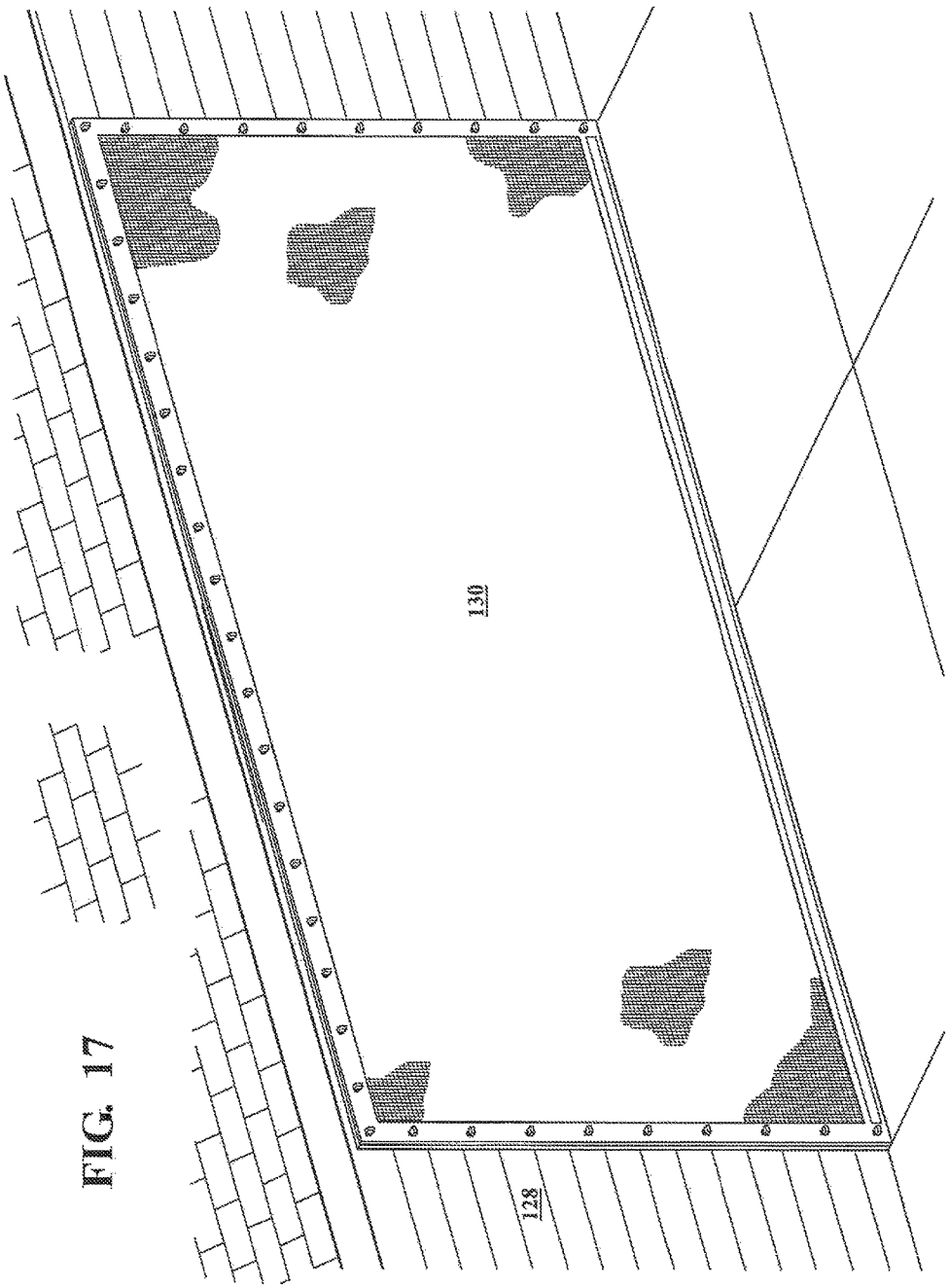
FIG. 17 is an environmental view of a further application of fastener and channel rail mounted assembly applied over an enlarged garage door type opening.

FIG. 17 is an environmental view of a further application of fastener and channel rail mounted assembly (this depicting for exemplary sake the twist lock fasteners 90 previously described in FIGS. 7-9 and which are installed over a plurality of three edge proximate interconnecting channel rails (not shown but generally corresponding to top rail 10 and side rails 48 and 50 with bottom rail 12 deleted) in turn secured to edge proximate extending locations associated with any type of opening (also hidden from view), and such as further depicted as an enlarged garage door or like opening associated with a structure 128. A suitably dimensioned covering material 130 is provided and which can again include any type of breathable mesh or impervious material, about which extends either a flexible or rigid binding or perimeter through which are formed a suitable array of spaced apertures (such as previously depicted at 96 in FIG. 7) for facilitating installation of the material 130.

Figure 18:
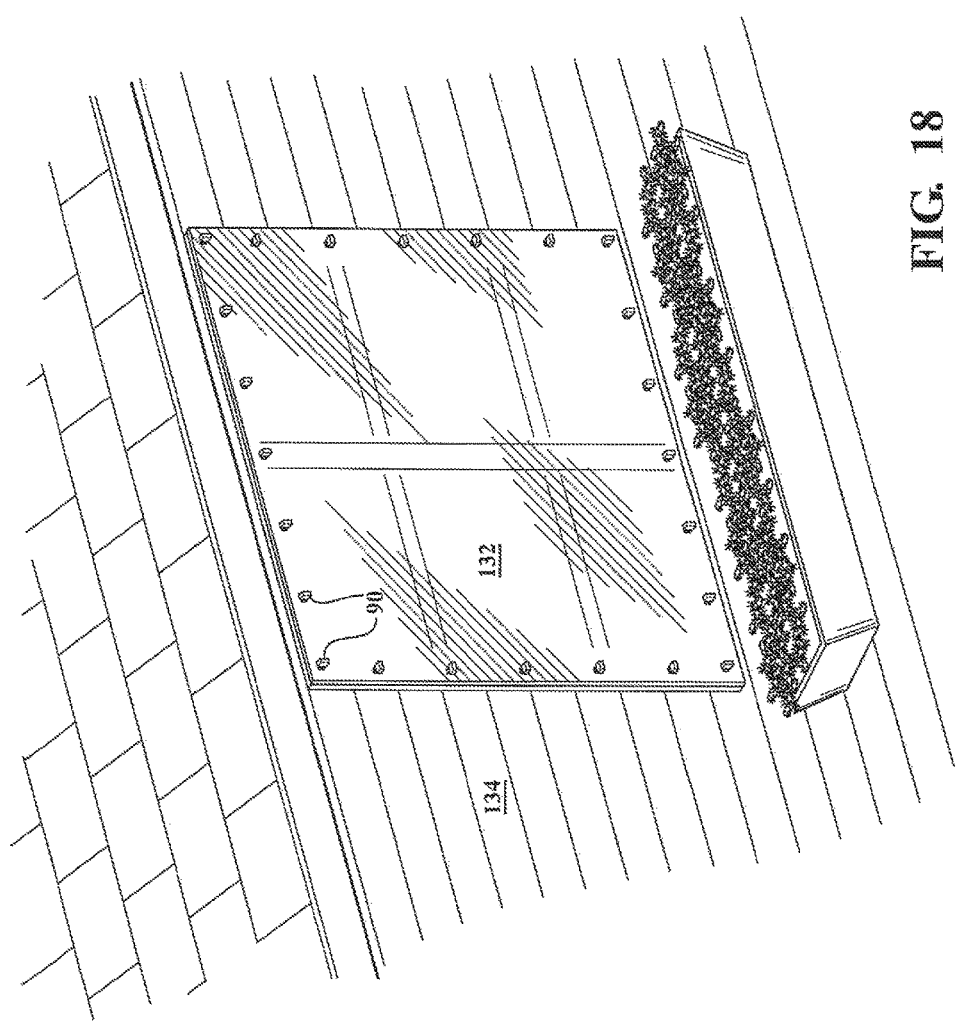
FIG. 18 is a yet further environmental view of a yet further application applied over a window type opening.

Finally, FIG. 18 is a yet further environmental view of a yet further application of fasteners (again twist lock type fastener 90) applied over a window type opening about which are secured an arrangement of four rails 10, 12, 48 and 50 in the manner previously described. A covering 132 is depicted mounted over the window or like opening (not shown) associated with a structure 134, and which may again possess a similar arrangement of binding edge extending mounting apertures for receiving the individual twist lock portions 90. The coverings 132 is further depicted as a plasticized or other impervious material (such further optionally exhibiting transparent or translucent properties) as a winterizing cover and as opposed to alternate use with a seasonal and breathable mesh depicted previously at 92. In this fashion a variety of different covering materials, varying by weight and or construction, can be provided as alternate covering for different seasons (e.g. mesh material in summer and impervious/heavy duty sealing cover for winter).

Figure 19:
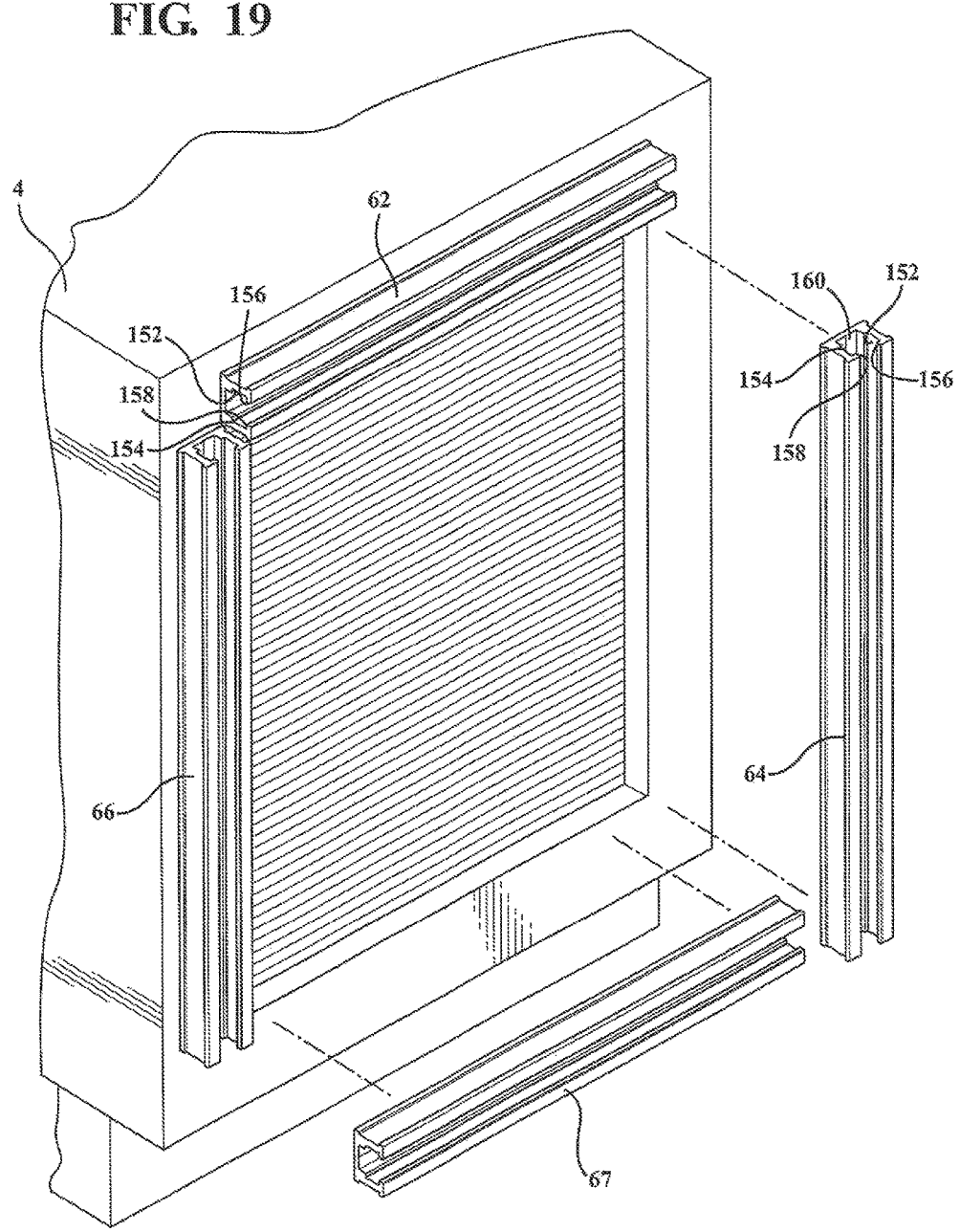
FIG. 19 is a partially exploded perspective of a further variant of the assembly and illustrating a plurality of modified elongated track defining supports secured to the air intake face surrounding the central opening.

Referring to FIG. 19, a partially exploded perspective is shown of a further variant of the assembly and illustrating the plurality of modified elongated track defining supports previously depicted at 62, 64, 66 (and further at 67), secured to the air intake face of the associated structure 4 surrounding the central opening. As previously described, the track defined supports can exhibit any desired cross sectional shape or profile and may in one non-limited example, be constructed of an aluminum, plastic or other suitable extruded, stamped or otherwise formed material.

As further shown, the track supports may exhibit a modified "U" shaped inner channel or profile for receiving the inserting portions of the various fastener arrangements for securing the filter or mesh to the arranged track supports. As will also be described and shown in additional detail, the supports have an increased cross sectional thickness, with their cross sectional interior channels exhibiting irregular or stepped surfaces (as compared to the channel supports 10, 12 in FIG. 1).

FIG. 20 is a cross sectional cutaway of a selected track support 62 from FIG. 19 and illustrating an underside positioned magnet 132 (see also FIG. 33) for assisting in releasably securing the support in extending fashion along a metal receiving surface of the intake face 4. Corresponding FIG. 32 is a cutaway plan illustration of selected track support 62 and depicting a two-sided adhesive tape 134 backing for securing the support to an intake face location.

Figure 32:
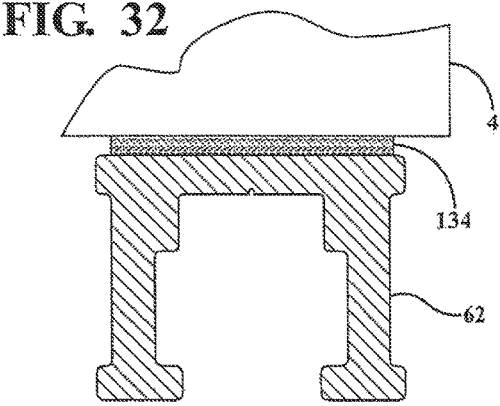
FIG. 32 is a cutaway plan illustration of a selected track support and depicting a two-sided adhesive tape backing for securing the support to an intake face location.
Figure 33:
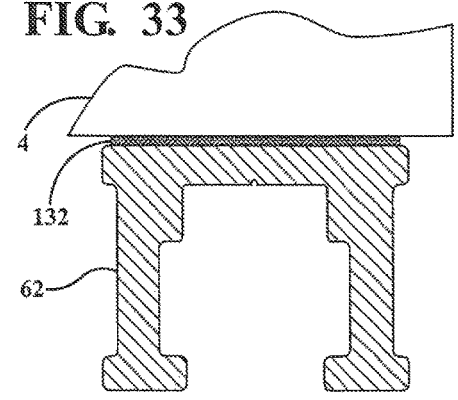
FIG. 33 is a similar plan illustration of the magnetic backing of FIG. 20 for securing the track support of FIG. 32 to the intake face location.
Figure 34:
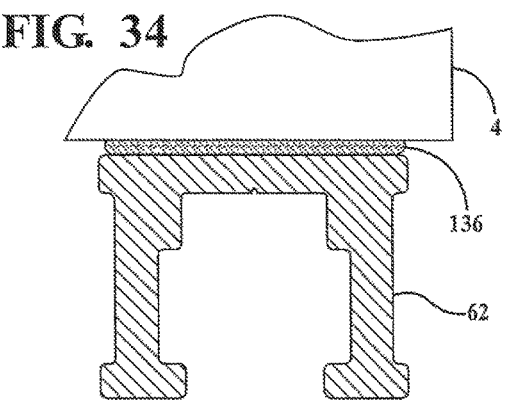
FIG. 34 is a further plan illustration similar to FIGS. 32-33 of a glue for attaching the track support to the intake face location.
Figure 35:
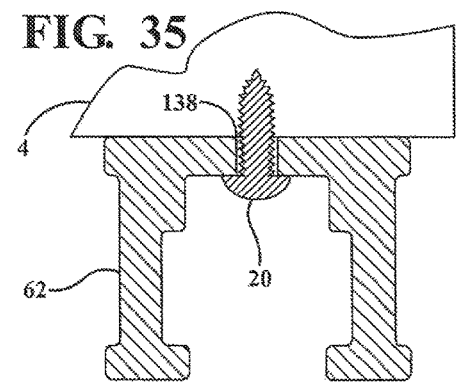
FIG. 35 is a yet further plan illustration of a screw passing through an aperture in the base of the track support for mounting to the intake face location.

FIG. 34 is a further plan illustration similar to FIGS. 32-33 of a glue 136 for attaching the track support 62 to the intake face location. FIG. 35 is a yet further plan illustration of a conventional screw, again at 20, passing through an aperture 138 in a base of the track support for mounting to the intake face location.

Proceeding to FIG. 21, an illustration is provided generally at 140 of a selected twist lock fastener utilized in the engagement protocol of FIG. 20. Similar to the twist lock variant previously disclosed, a generally planar base 142 is adapted to being received within the open end of the interior channel or track defined in the elongated support, a fixed body portion 144 extending from the base and concluding in an end support twist lock portion 146 (see further rotated position 146' depicted in phantom). The base 142 further exhibits widened end support locations 148 and 150, these being dimensioned for facilitating frictional and positional fitting within the interior track defining sides, see at 152 and 154 of the support 62 in FIG. 20, concurrent with the upper edge surfaces of the base 142 abutting the forward inside edges 156 and 158 associated with the narrowed slot, a rear or back surface 160 interconnecting the sides 152 and 154 and completing the interior channel profile.

FIG. 22 is a cross sectional cutaway of a selected track support 62 as previously shown in FIG. 20 and illustrating a variant 140' of the twist lock fastener exhibiting a lengthened fixed support portion 144'. FIG. 23 is an illustration of the modified twist lock fastener, similar to that shown in FIG. 21, and exhibiting the fastener 140' installed in the track support 62 such that the lengthened fixed support portion 144' is capable of accommodating any of thicker filter screens, multiple layer screens or materials (see as depicted at 92/92' with dual layers of reinforced edges 94/94' and aligning ringlet or grommet defined receiving apertures 92. As with the variant of fastener in FIG. 21, the widened base locations 148 and 150 facilitate frictional engagement along the interior side edges 152 and 154 of the supports.

FIG. 24 is a partially exploded view of a support track arrangement according to a modification of FIG. 19 and which includes the provision of intermediate end-to-end 162 and 164 and corner/angled 166, 168, 170, et seq. adaptors or plugs for assembling running lengths of support track (see further at 62/62', 66, 68, et seq.) in varying arrangements upon the air intake face. The intermediate adaptors 162 and 164, as shown, each exhibit a central support from which project a pair of opposite engaging portions 172/174 which are adapted to engage the interior defined channel ends of the supports. The corner/angled adaptors each further include a generally "L" shape with engaging portions 176 and 178 for joining angled ends of the support track, such as in the perpendicular arrangement shown.

FIG. 24A is a similar illustration to FIG. 24 and showing a variant of the corner adaptors/plugs, at 180, 182, 184, and 186 for providing the assembled support track as a rigid standalone frame with a seamless edge appearance. As further best shown in kit assembly view of FIG. 39, the modified corner plugs 180-186 each include an additional outer "L" shaped embossed portion, see at 188, 190, 192 and 194 corresponding to each plug 180-186. Upon the angled projecting portions (see further at 196 and 198 for selected plug 180) seating within the interior channels of associated angled supports 62/66, the outer embossed portions (188) of each corner plug seats against the ends surfaces of the channels to establish the seamless appearance shown.

FIGS. 24B-24C respectively illustrated exploded and assembled views of a further three sided variant of linear end-to-end adaptor, see at 191, which is configured to attached abutting opposing ends of first 62 and second 62' selected running lengths of support track, these being shown in reduced length. As best shown in FIG. 24B, the three sided linear adapter 191 exhibits a generally reverse "C" shape in cross section and defines an inside configured profile (see interconnected surfaces 193, 195 and 197) which is adapted to slidingly receive and seat the opposing ends of the track 62/62' in abutting fashion.

The adapter 191 can include any flexible material, such as a heavy duty nylon or plastic which has a high degree of resilience and, as further shown, is flexibly applied over the three projecting sides of the opposing mating ends of the track sections 62/62', so that the end-most opposing track sections are thereafter frictionally gripped and restrained within the inner "C" defined surfaces 193, 195 and 197. Without limitation, the opposing ends of the tracks can be inserted within the adaptor 191 (as well as the adaptor variant depicted at 162/164 in FIG. 24), either prior or subsequent to mounting the track sections to the air intake face. In this fashion, the present inventions provide for a rigid stand-alone frame construction for supporting the screen or other covering.

As further understood, the construction of the connectors/plugs can include a compressible polymer or the like (such also potentially including a foam outer layering) which can frictionally seat within the irregular end profile of the supports and facilitates seating engagement between the linear end-to-end or angled supports and thereby provides for secure and seamless engagement between the interconnected sections of track support.

Figure 25:
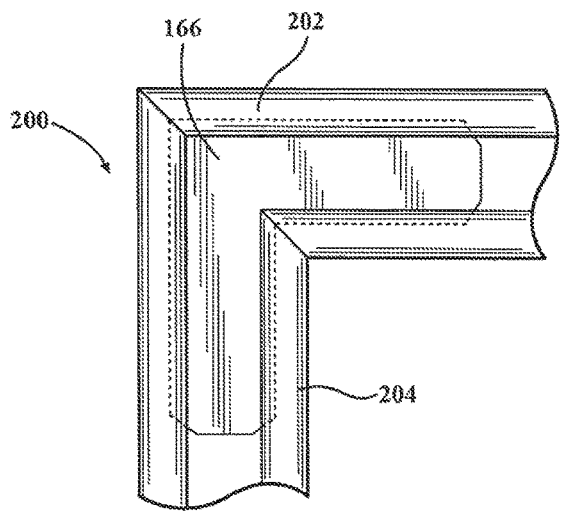
FIG. 25 is a partial corner depiction of a further joining arrangement established between perpendicular arranged support track and having a mitered appearance.
Figure 26:
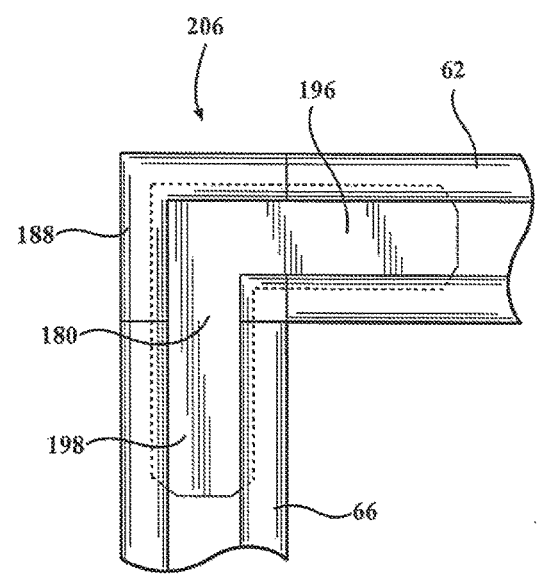
FIG. 26 is a corresponding corner depiction showing the modified corner adaptors of FIG. 24A.
Figure 27:
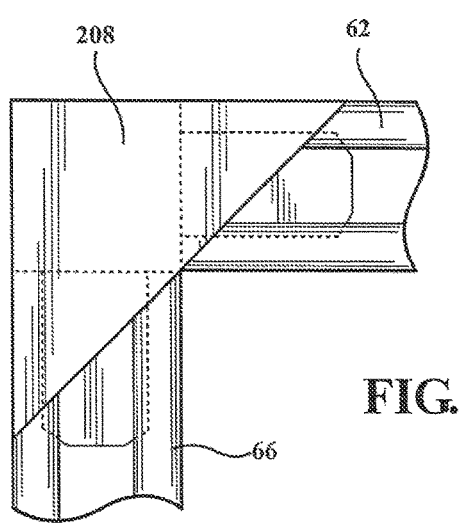
FIG. 27 is a further variant of a three dimensional triangular enclosure utilized with any variant of corner plug/adaptor and for providing additional structural support between angled extending ends of support track.

FIG. 25 is a partial corner depiction, generally at 200 of a further joining arrangement established between perpendicular arranged support track 202 and 204, such having a mitered appearance and within opposing ends of which the angled corner adaptor 166 is frictionally seated. FIG. 26 is a corresponding corner depiction, generally at 206, showing the modified corner adaptors of FIG. 24A. FIG. 27 is a further variant of a three dimensional triangular enclosure 208 utilized with any variant of corner plug/adaptor and for providing additional structural support between angled extending ends of support track 62 and 66;

FIG. 28 is an illustration of a further variant of screen attached grommet in the form of a two-piece sandwich configuration 210 and 212 for inter-engaging through opposite sides of a reinforced corner location 214 of an associated screen 216. The grommets each include a planar disc shape with the first piece 210 having perimeter defined apertures 218 and a central receiving aperture 220. The second piece 212 likewise includes a plurality of prongs 222 projecting from a surface thereof (a central aperture 221 also defined in the piece 212) and which, upon piercing through the covering or screen 216 (see as depicted by aperture patterns 224, 226, et seq. defined in the reinforced edge 214) resistively engage and seat within the perimeter defined apertures 218 of the first piece 210 in order to mount both pieces together on opposite sides of the material with the inner apertures 220/221 in alignment.

The two piece grommet assembly can also be utilized with a knife edge such that, and upon mounting in sandwiching fashion about the screen (not previously apertured such as at 224/226), the knife edge can be utilized to cut out the screen portion revealed by the mating aperture defining inner perimeter surfaces 220/221, this in order to create the necessary interior aperture for receiving the selected fastener portion. FIG. 29 is a further partially exploded plan view of the assembled screen grommet of FIG. 28 in combination with the twist lock fastener (140) of FIGS. 21 and 23.

Figure 30:
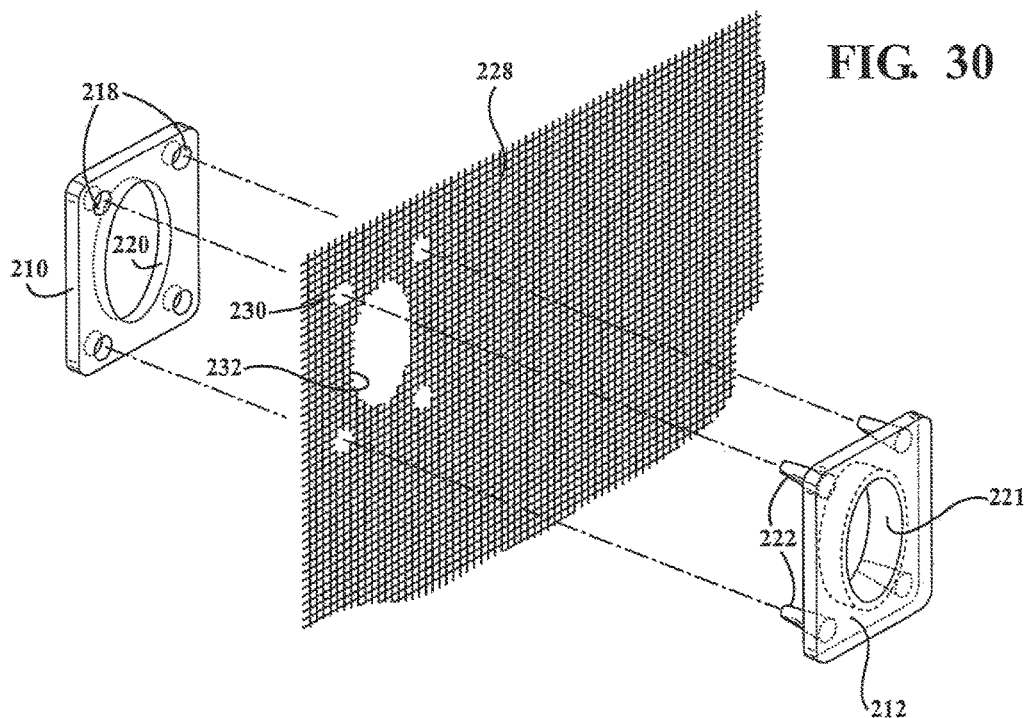
FIG. 30 is an illustration similar to FIG. 28 and depicting an unreinforced screen utilized in combination with the two piece assembleable grommet.

FIG. 30 is an illustration similar to FIG. 28 and depicting an unreinforced screen 228 utilized in combination with the two piece assembleable grommet 210/212. As with the embodiment of FIGS. 28-29, the two pieces are assembleable in a manner which sandwiches a perimeter location of the screen 228, such as which can exhibit pre-apertured locations 230, 232, et seq.

Figure 31:
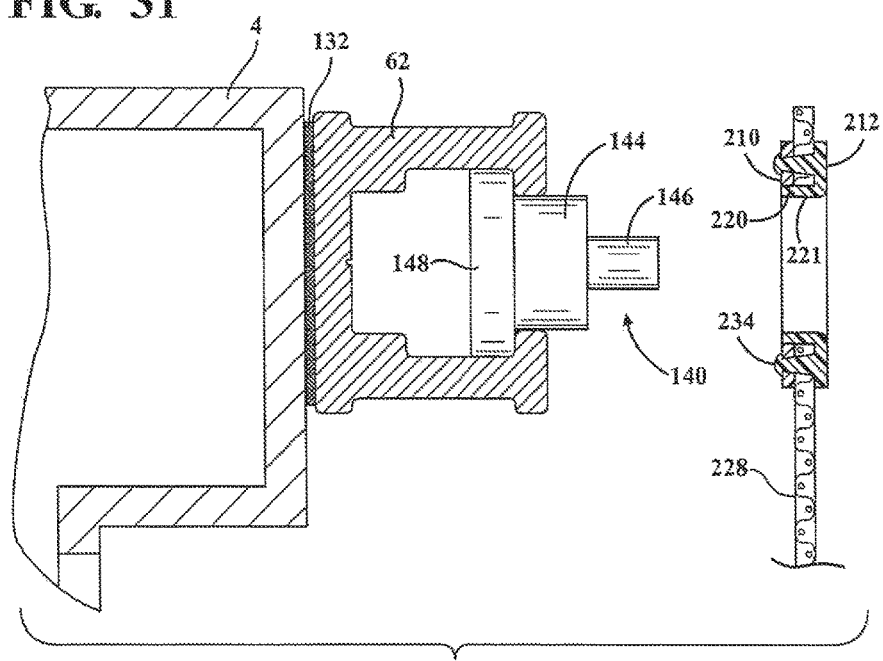
FIG. 31 is a further partially exploded plan view of the assembled screen grommet of FIG. 30 in combination with the toggle lock fastener of FIGS. 20-21.

Alternately, the screen 228 can be provided in stock form without any pre-incisions, such as along the perimeter receiving locations for receiving the grommets. The screen 228 can be sized, on site, such as with the use of a knife edge. It is also envisioned that the variations of the prongs 222 can also include rounded end locations (see at 234 in cutaway in each of FIGS. 29 and 31) which are sufficiently deformable in order to pass through the interior profiles defined by the mating apertures 218 of the grommet piece 210, and subsequently engage the reverse (rear) surface locations of the piece 210 in order to maintain the sandwiched locations of the grommets pieces 210/212 with the screen therebetween. FIG. 31 is a further partially exploded plan view of the assembled screen grommet of FIG. 30 in combination with the twist lock fastener of FIGS. 21 and 23.

Figure 36:
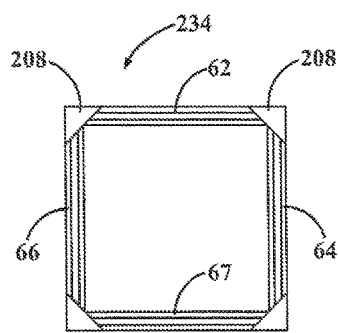
FIG. 36 is a front plan illustration of a square support track arrangement in combination with the triangular three dimensional corner supports of FIG. 27.

Proceeding to FIG. 36, a front plan illustration is generally shown at 234 of a square track support arrangement (see supports 62, 64, 66 and 67) in combination with the triangular three dimensional corner supports 208 of FIG. 27. The corner supports, as previously described, each include a triangular 3D construction and exhibit a hollow interior and can be concurrently fastened to the air intake surface for providing aligning and retaining support between opposing arrayed ends of track support, such further attached fixedly or removably in any fashion desired and which can further include any of end-to-end, mitred or other interconnecting arrangement.

Figure 37:
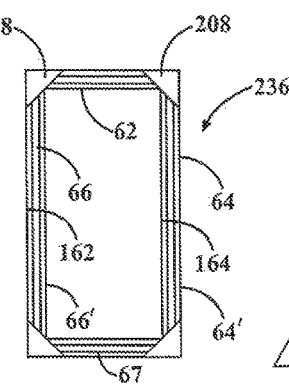
FIG. 37 is a front plan view similar to FIG. 36 of a rectangular support track arrangement.
Figure 38:
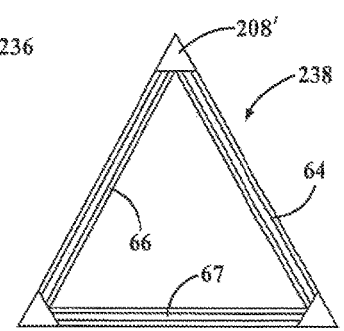
FIG. 38 is a further front plan view of a triangular support track arrangement.

FIG. 37 is a front plan view, similar to FIG. 36, of a rectangular support track arrangement 236, such as which can be assembled using the linear adapters 162/164, in combination with pairs 64/64' and 66/66' of elongated track supports in combination with upper 62 and lower 67 interconnecting supports. FIG. 38 is a further front plan view of a triangular support track arrangement 238 and which is shown with three supports 65, 66 and 67 along with a modification 208' of the three dimensional corner supports. The triangular arrangement 238 is provided to support the proposition that the supports can be configured or arrayed in any perimeter extending fashion for covering any type of air intake opening.

Figure 39:
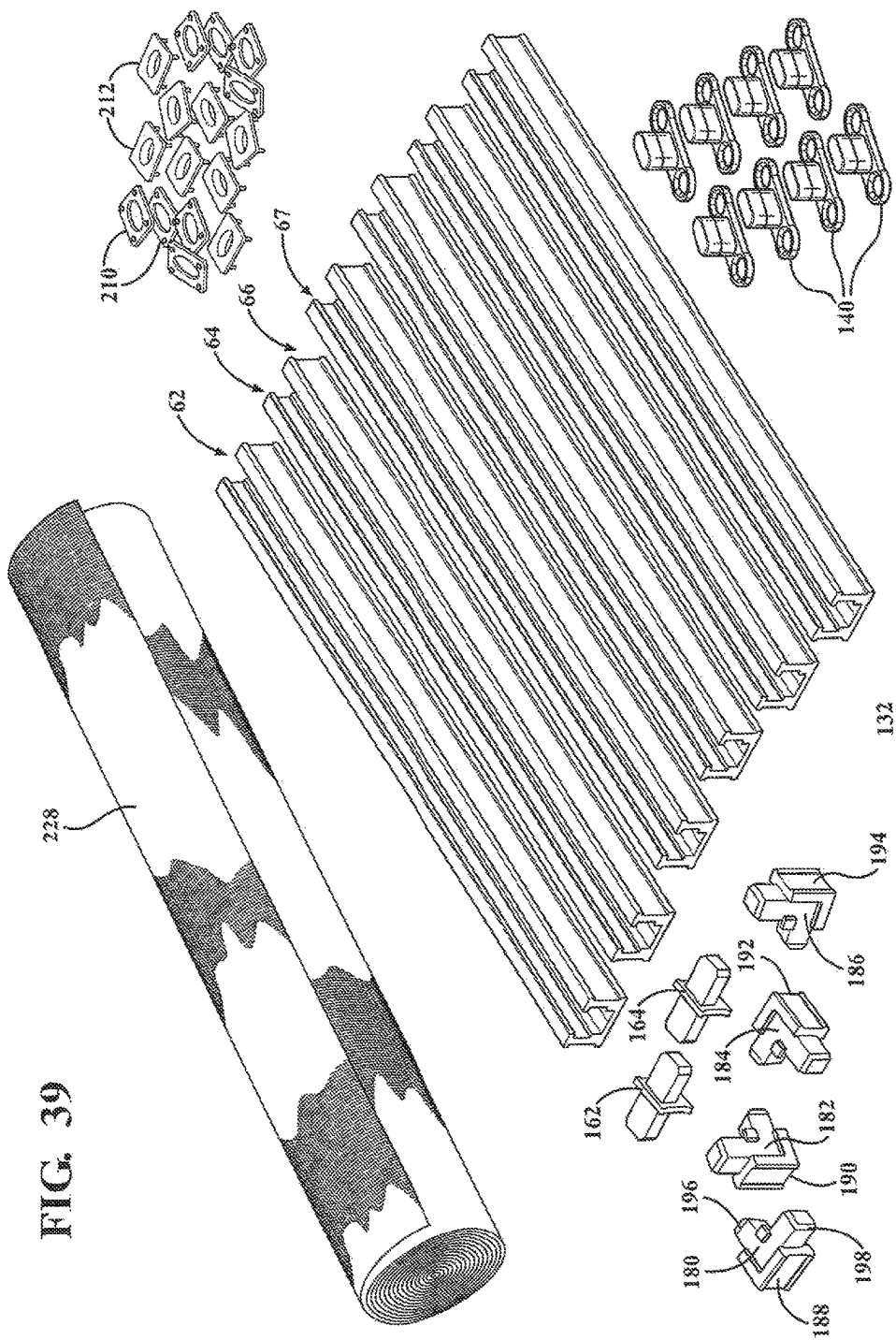
FIG. 39 is a kit illustration depicting a plurality of support tracks, stock filter, assembleable grommets, and twist lock fasteners (FIG. 21), according to one non-limiting variant of the present inventions.

FIG. 39 is a kit illustration depicting one non-limiting combination of items utilized in the method and assembly of constructing a screen, mesh or other covering supported upon the intake face over the air intake opening. As described, the kit and assembly can include a selected plurality of the support tracks, 62, 64, 66, 67, et seq., stock filter or other flexible mesh or non-mesh material 228 assembleable grommets 210/212, any type of fastener (represented by twist lock fasteners 140 of FIG. 21), and any combination of linear end-to-end 162/164 and angled/corner 180, 182, 184, et seq. interconnecting adaptors according to any one of a number of non-limiting variant of the present inventions.

As further shown, the supports 62, 64, 66 and 67 can include magnetic backings 132 (or alternatively any other permanent or removable mounting options as previously described not limited to adhesives, adhesive tape, fasteners, glue, etc). Advantages of the present invention include the ability to both quickly install any desired covering material utilizing any of the fasteners previously disclosed, combined with the self-aligning aspects provided by the combination of channel rails and fasteners, this in order to accommodate variations in production tolerances of the filter as it translates to installation and alignment when installed. Additional variants further envision the utilization of any number of channel supporting rails typically ranging from one to four, with two, three or four such rails being the typical arrangements.

Figure 40:
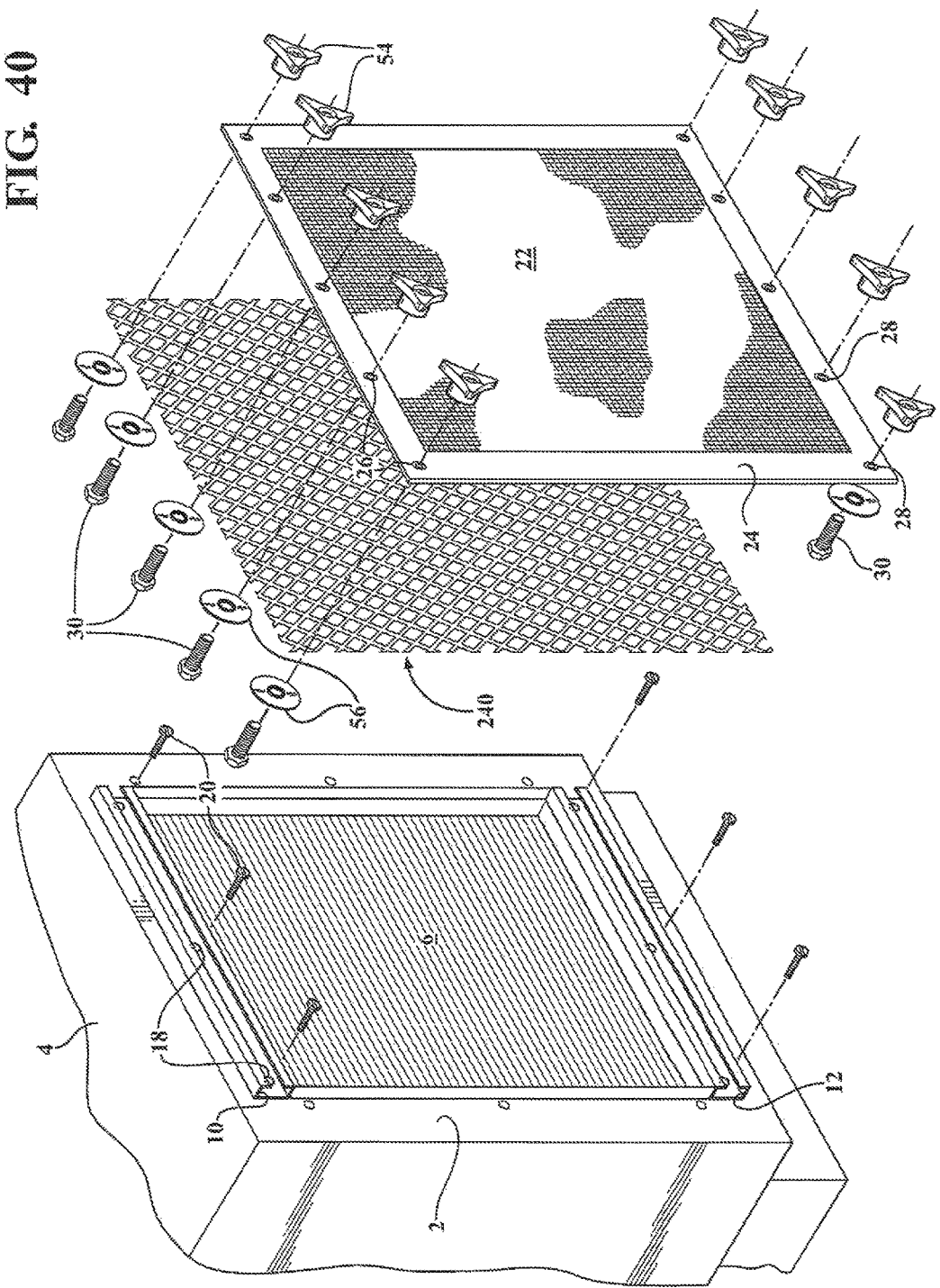
FIG. 40 is an exploded view of a rigid lattice style mesh provided in combination with the intake face mounted track mount kit and the overlaying screen according to a further non-limiting embodiment.
Figure 41:
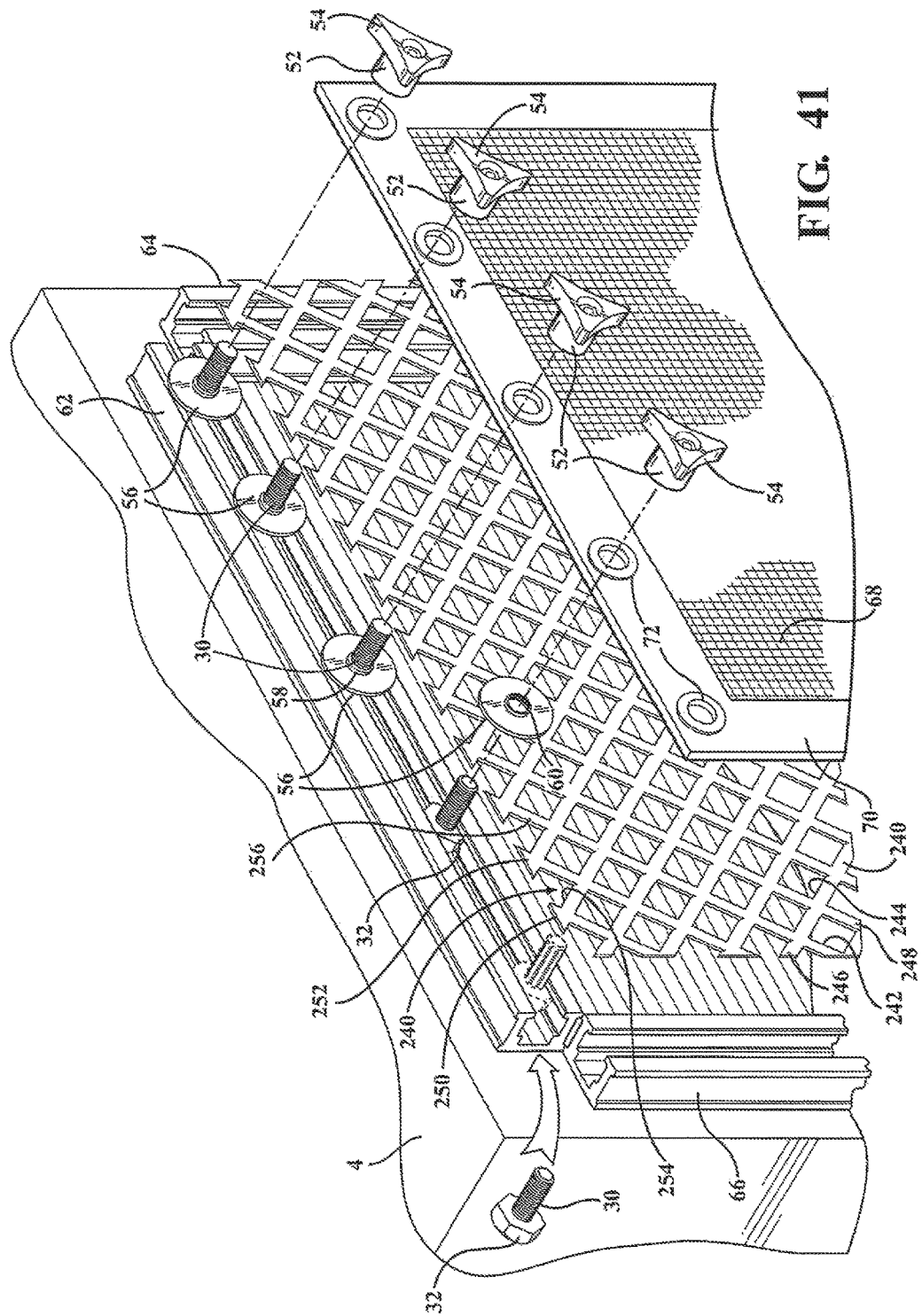
FIG. 41 is an enlarged partial perspective of the variant of FIG. 40 and further illustrating the rigid lattice style mesh in a partially assembled condition overlaying the projecting threaded shafts of the associated bolt fasteners pre-positioned within the extending tracks mounted to the intake face.
Figure 42:
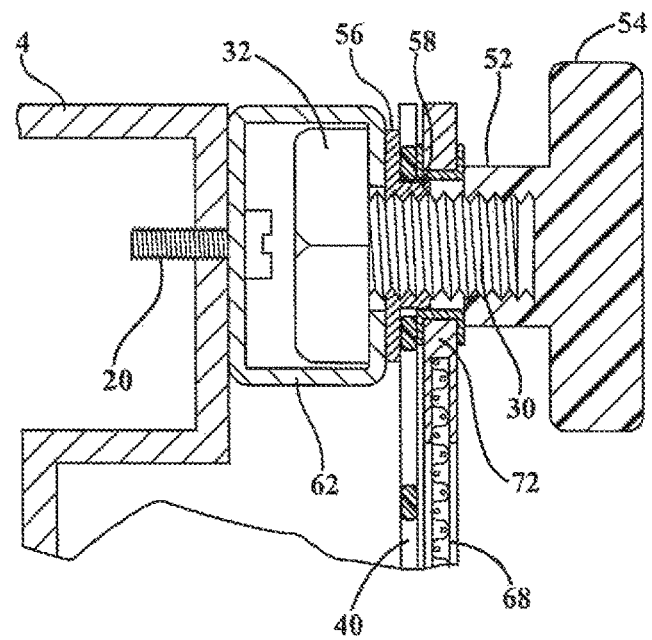
FIG. 42 is a side cutaway illustration of a fully assembled rigid mesh and overlaid screen relative to the air intake face and engaging fasteners.

Referring now to the succession of views shown in FIGS. 40-42, a pair of exploded (FIGS. 40 and 41) and side cutaway/assembled (FIG. 42) views are shown of a lattice style mesh 240 provided in combination with the intake face mounted track mount kit (see again exemplary upper 10 and lower 12 extending track supports) and the overlaying screen (again as previously shown at 22 in non-limiting representation) according to a further non-limiting embodiment. A fastener configuration similar to that shown previously in FIGS. 6A and 6B is depicted and again includes an arrangement of twist caps 52 in use with the fasteners (threaded shafts 30 which are also termed "snug nuts" as well as an equal number of hex heads 32) of FIG. 5.

As previously noted, the twist knobs depict collars which are interiorly threaded from an open inner end (not shown) and further each include a triangular (or other suitable and polygonal) shaped gripping end 54. As additionally shown in FIG. 6B, an equal plurality of modified washers 56 are provided, each of these including a protuberant collar 58 defining an interiorly threaded profile 60. The bolts (hex head 32 and stem 30) are pre-installed into an open channel end defined in a modified support track (see at 62, 64 and 66 in FIG. 6 arranged about the intake opening of the associated structure 4) and so that the threaded stems 30 projecting through the front disposed slot in the manner depicted. As further previously described, the elongated track supports are similar in application to those previously disclosed at 10 and 12 in FIG. 1 and can include a slightly modified extrusion profile and, as will be further described, can be attached both to the face of intake structure and interconnected in end-to-end fashion according to a variety of different configurations.

The rigid mesh 240 in FIGS. 40-42 can include any semi-rigid or rigid apertured material including any of a metal, plastic coated metal, rigid nylon, fiberglass, and other molded materials, etc. and which, as shown in each of FIGS. 40-41, exhibits a generally rectangular outline which generally matches the dimensions of the multi-sided track mount kit. The mesh 240 can also include either of a completely or substantially rigid material (e.g. providing any degree of minor bend or flex) as needed to facilitate securing upon the track mount kit.

The rigid mesh 240 further exhibits an aperture pattern to permit the projecting bolt fasteners, or other projecting engagement portion associated with any other configuration of fastener, to extend from the track and so as to project beyond any of interior or edge proximate locations of the mesh for receiving the aperture edge proximate locations of the filter or other suitable covering. As further shown, this can include the rigid mesh 240 exhibiting diamond shaped or other apertures (see inner perimeter surfaces at 242, 244, et seq. in FIG. 41) which establish the four sided diamond shaped apertures and which are further defined by crosswise extending and interconnecting portions 246, 248, et seq. further defining the physical construction of the rigid mesh.

The rigid mesh additionally depicts enlarged end defined locations 250, 252, et seq. which can combine with open communicating and edge proximate diamond aperture profiles (see at 254, 256, et seq.) in order to seat the projecting bolt stems 30 in edge engaging fashion about the outer perimeter of the mesh 240. Alternatively, the rigid mesh 240 can be sized so that the bolt stems seat through interior located diamond (or other shaped) apertures 242, 244, et seq. which are located proximate the extending edges of the mesh.

As previously described, FIG. 41 is an enlarged partial perspective of the variant of FIG. 40 and further illustrating the rigid lattice style mesh in a partially assembled condition overlaying the projecting threaded shafts of the associated bolt fasteners pre-positioned within the extending tracks mounted to the intake face. FIG. 42 is a side cutaway illustration of a fully assembled rigid mesh and overlaid screen relative to the air intake face and engaging fasteners.

In use according to one non-limiting variant, the rigid mesh 240 is provided and is positioned between the filter 22 and the track defining supports (kit) in order to provide additional protection to the intake face and surrounding opening, prevents the filter from being sucked into the intake opening as well as protecting the underlying mechanical components, i.e. condenser coils, the overlaid filter, such as to protect against tearing in response to the striking of objects during windy conditions and the like such as hail and other airborne objects. As further described, the configuration of flexible outer screen 22 with edge engaging apertures 26, along with the selected arrangement of fasteners shown is but one possible example of many which can be utilized with the rigid mesh 240 (such further contemplating the rigid mesh being used as a stand-alone installation as further described in FIG. 45). The variants of FIGS. 40-45 also contemplate the use of any other type of fastener, including both shown in the other illustrations as well as other non-illustrated fasteners which may be contemplated within the overall scope of the disclosure.

Figure 43:
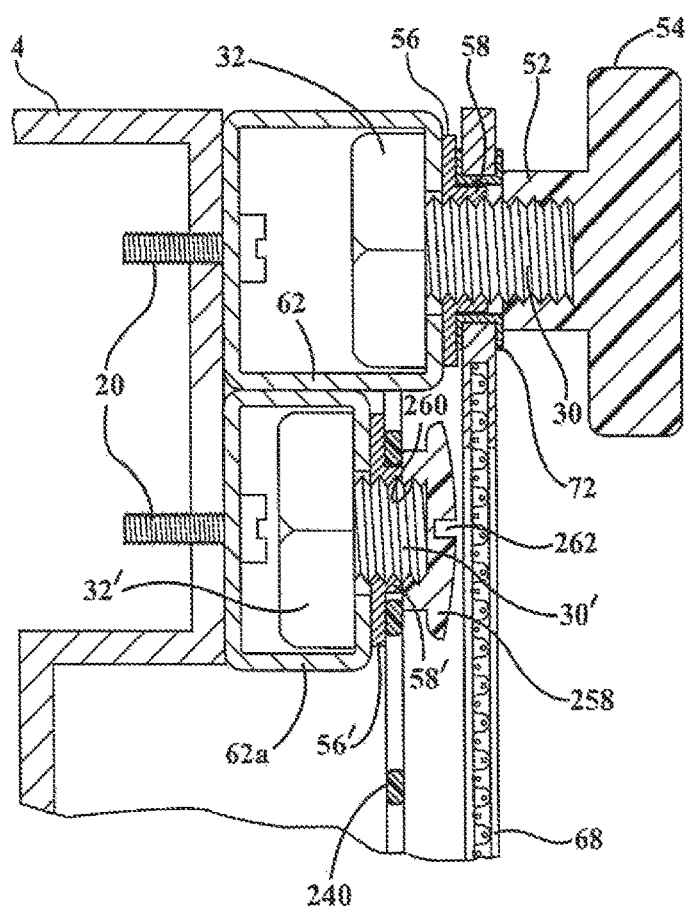
FIG. 43 is a further side cutaway of a variant of FIG. 42, and in which a second inwardly positioned support track is secured to the intake face and separately secures the rigid mesh.

Proceeding to FIG. 43, a further side cutaway is shown of a variant of FIG. 42, and in which a second inwardly positioned support track 62a is secured to the intake face 4 relative to the outer track 62. As further shown, the inner track 62a may include reduced dimensions relative to the outer track 62, such that an end face of the track 62a is recessed relative to the channel mounting interface of the outer track 62.

The inner track 62a separately mounts the rigid mesh 240, with the use of reduced dimension bolt fastener (shaft or extending portion 30' and first inserting portion or head 32') which is supported within the track interior of the support 62a. A number of modified washer 56 are again provided, each of these including a protuberant collar 58 defining an interiorly threaded profile 60.

As described in the construction of FIG. 42, the bolts (hex head 32' and stem 30') are pre-installed into an open channel end defined in a modified support track (in this instance at 62a but which is understood to include the use of any interconnecting arrangement of inwardly supported support tracks which can correspond in overall outline to those previously illustrated at 62, 64 and 66 in FIG. 6 arranged about the intake opening of the associated structure 4) and so that the threaded stems 30' of the inwardly supported support tracks projecting through the front disposed slot in the manner depicted. A cap (also end attachable covering portion) 258, further such as a metal or heavy duty plastic/nylon, includes a designated dimension and thickness with an inner recess profile 260 for rotatably interengaging the threads 30' of the modified bolt fastener. A screw driver slot 262 is also shown for installing the cap 258 in order compress the rigid mesh 240 against the slot defined end surfaces of the inner support tracks 62a and supported modified washers 58. The non-limiting example of screen 68 is mounted to the outer support tracks 62, 64, 66, et seq. in the manner previously described and as shown in FIG. 42.

Figure 44:
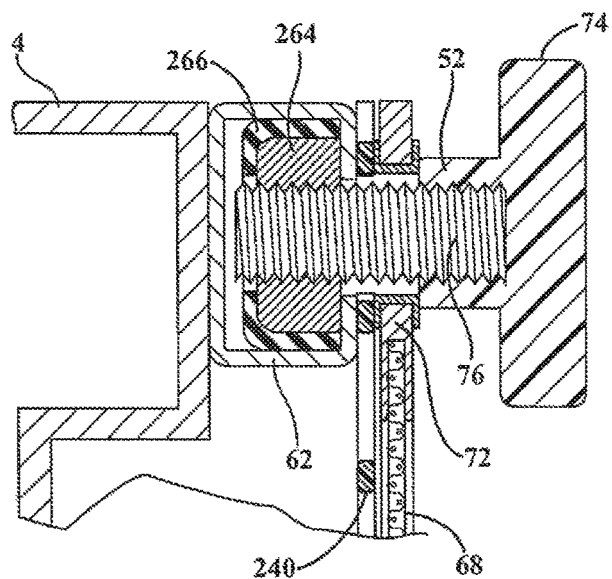
FIG. 44 is a further side cutaway of a variant similar to FIG. 42 and illustrating a different fastener arrangement with a twist knob with threaded projecting stem provided in combination with a reconfigured and interiorly threaded nut having an outer rubberized and gripping coating and which is inserted through the open end of the support track.

FIG. 44 is a further side cutaway of a variant similar to FIG. 42 and illustrating a different fastener arrangement again including a reconfigured twist knob 74 such as previously shown in FIG. 6C, and which is modified so that the threaded projecting stem 76 is mounted to the inside of the knob 74. A reconfigured and interiorly threaded nut 264 is provided (can also be termed a first fastener portion), having an outer rubberized and gripping coating 266, and which is inserted through the open end of the support track.

Similar to the mounting arrangements previously described, one non-limiting installation procedure can include partially engaging the twist knob 74 with extending shaft (or extending portion) 76 to the nut (first fastener portion) 264, then translating the nut from the open installation end of the support track 62 to the desired installation location, following which the knob (or covering cap) 74 is removed and the mesh 240 and screen 68 positioned in place, prior to the extending stem 76 of the knob being reinserted through the screen, mesh and back into threaded rotational engagement with the nut 264. The outer rubberized coating 266 applied around the nut is further dimensioned such that it provides an intermediate friction fit with the inside walls of the track interior and, in this manner, prevents inadvertent sliding of the nut 264 during installation.

Figure 45:
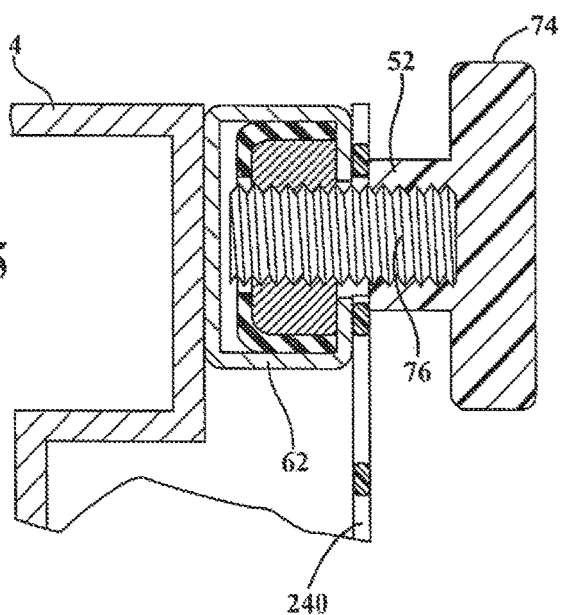
FIG. 45 is a modification of the variant of FIG. 44 and depicting a further mounting arrangement utilizing only the rigid mesh component.

Finally, FIG. 45 is a modification of the variant of FIG. 44 to the extent only that it depicts a further mounting arrangement utilizing only the rigid mesh component 240 mounted to any arrangement or configuration of the support tracks 62, 64, 66, et. seq. and which would not require the outer screen 68 (or other flexible pervious or impervious covering). The present invention contemplates any of a number of mounting arrangements utilizing the rigid mesh alone (such as for use as a hail guard protector) or in use in combination with any type of pervious or impervious screen, filter or other outer covering to provide winterization of the desired mechanical equipment, again including but not limited to those including condenser coils.

Having described my invention, other and additional preferred embodiments will become apparent to those skilled in the art to which it pertains and without deviating from the scope of the appended claims.

I claim:

1. An assembly for installing a covering over an air intake opening in engagement with a surrounding perimeter extending face, comprising:
   a plurality of elongated supports attached to the perimeter extending face around the intake opening, each of said supports exhibiting a forwardly projecting support surface within which is configured a slot;
   a plurality of inserts inter-engaging within consecutive positioned elongated supports to define a closed perimeter;
   a plurality of fasteners installable through an accessible end location of each support such that a base of each fastener is retained within and traversable along an interior channel defined in said support, a projecting portion of each fastener extending from said base and through said slot;
   a mesh exhibiting a rectangular outline which overlays said elongated supports, said mesh including any substantially to fully rigid material and exhibiting an aperture pattern to permit said projecting portions of said fasteners to extend through said mesh and to retain said mesh over said forwardly projecting support surfaces; and
   the covering further including a flexible material having a plurality of perimeter defined apertures for receiving said projecting portions of said fasteners to affix the flexible material against an exterior surface of said rigid mesh in engagement with the perimeter extending supports and to extend over the intake opening.

2. The assembly as described in claim 1, further comprising said aperture pattern of said mesh extending in proximity to outer edge locations for receiving said projecting portions of said fastener.

3. The assembly as described in claim 2, wherein said aperture pattern further comprising diamond shaped apertures which are further defined by cross-wise extending and interconnecting portions.

4. The assembly as described in claim 3, wherein said interconnecting portions of said mesh further comprising enlarged end defined locations which, in combination with said aperture pattern, seat said projecting portions in edge engaging fashion about a perimeter defined by said outer edge locations of said mesh.

5. The assembly as described in claim 1, wherein said projecting portion of each fastener further comprising a fixed extending portion and an end-most extending and rotatable twist lock portion.

6. The assembly as described in claim 1, wherein said projecting portion of each fastener further comprising a fixed extending portion and an end-most extending and rotatable toggle lock fastener.

7. The assembly as described in claim 1, wherein said projecting portion of each fastener further comprising a hook shaped fastener.

8. The assembly as described in claim 1, wherein said projecting portion of each fastener further comprising a carabiner type fastener.

9. The assembly as described in claim 1, wherein said base of each fastener further comprising a planar shape with at least one widened location for resistively engaging opposing inner spaced apart surfaces of said support establishing said interior channel.

10. The assembly as described in claim 1, wherein said inserts further comprising each of angled and linear interconnecting configurations for configuring the perimeter as any of a square or rectangular.

11. The assembly as described in claim 1, further comprising any of a two-sided adhesive tape, a magnet, a glue or screw/bolt for securing said base surface of each support to the intake face.

12. An assembly kit for installing a flexible ply material to a perimeter extending face surrounding an air intake opening, said kit comprising:
    a plurality of elongated supports adapted to being arranged in extending fashion around the intake opening, each of said supports having a base surface adapted to being secured along the face of the intake opening, each of said supports exhibiting a "U" shaped cross sectional shape with a forwardly projecting support surface within which is configured a slot;
    a plurality of fasteners installable through an accessible end location of each support such that a base of each fastener is retained within and traversable along an interior channel defined in said support, a projecting portion of each fastener extending from said base and through said slot;
    a plurality of inserts adapted to inter-engage said end locations of opposing extending supports to define a closed perimeter, said inserts further including each of angled and linear interconnecting configurations for configuring an extending perimeter of said elongated supports;
    a mesh exhibiting a rectangular outline overlays said elongated supports, said mesh including any substantially to fully rigid material and exhibiting an aperture pattern to permit said projecting portions of said fasteners to extend through said mesh and to retain said mesh over said forwardly projecting support surfaces; and
    the flexible ply material having a plurality of perimeter defined apertures configured about the flexible material for receiving said fasteners to affix the material against an exterior of said mesh and perimeter extending supports and to extend over the intake opening.

13. The kit as described in claim 12, further comprising a grommet in the form of a two-piece sandwich configuration for inter-engaging through opposite sides of a corner location of the flexible ply material.

14. The kit as described in claim 12, wherein said projecting portion of each fastener further comprising a fixed extending portion and an end-most extending and rotatable twist lock portion.

15. The kit as described in claim 12, wherein said projecting portion of each fastener further comprising a fixed extending portion and an end-most extending and rotatable toggle lock fastener.

16. The kit as described in claim 12, wherein said fasteners each further comprising a washer having linear extending edges seated within an interior channel associated with each support, a protuberant collar of said washer defining a central and interiorly threaded aperture, a hybrid tightening nut or knob with threaded shaft extending therefrom and engaging said washer to sandwich opposite sides of the flexible ply material.

17. The kit as described in claim 12, wherein said base of each fastener further comprising a planar shape with at least one widened location for resistively engaging opposing inner spaced apart surfaces of said support establishing said interior channel.

18. The kit as described in claim 12, wherein the flexible ply material further comprising a reinforced outer perimeter edge.

19. An assembly for protecting an air intake opening defined within a surrounding perimeter extending face, comprising:
 a plurality of elongated supports attached to the perimeter extending face at locations around the intake opening, each of said supports exhibiting a forwardly projecting support surface within which is configured a slot;
 a plurality of fasteners including a first portion installable through an accessible end location of each support and which is retained within and traversable along an interior channel defined in said support, a projecting portion of each fastener extending from said installed portion and through said slot;
 a rigid mesh exhibiting a polygonal outline which overlays said elongated supports, said mesh including any substantially to fully rigid material and exhibiting an aperture pattern to permit said projecting portions of said fasteners to extend through said mesh and to retain said mesh against said forwardly projecting support surfaces;
 a further end attaching portion associated with each fastener secured to said projecting portion to affix the rigid mesh in engagement with the perimeter extending supports over the intake opening; and
 an additional plurality of elongated supports attached to the perimeter extending face outwardly of said rigid mesh engaging elongated supports at locations around the intake opening, each of said outwardly engaging supports exhibiting a support surface projecting forwardly relative outer adjoining edges of said rigid mesh within which is configured a slot, a covering securing about an outer perimeter thereof to said outwardly positioned supports via a further plurality of fasteners to overlay and surround said rigid mesh.

20. An assembly for installing a covering over an air intake opening in engagement with a surrounding perimeter extending face, comprising:
 a plurality of elongated supports attached to the perimeter extending face around the intake opening, each of said supports exhibiting a forwardly projecting support surface within which is configured a slot;
 a plurality of fasteners installable through an accessible end location of each support such that a base of each fastener is retained within and traversable along an interior channel defined in said support, a projecting portion of each fastener extending from said base and through said slot;
 a mesh exhibiting a rectangular outline which overlays said elongated supports, said mesh including any substantially to fully rigid material and exhibiting an aperture pattern extending in proximity to outer edge locations for receiving projecting portions of said fasteners to extend through said mesh and to retain said mesh over said forwardly projecting support surfaces, said aperture pattern further including diamond shaped apertures which are further defined by cross-wise extending and interconnecting portions; and
 the covering further including a flexible material having a plurality of perimeter defined apertures for receiving said projecting portions of said fasteners to affix the flexible material against an exterior surface of said rigid mesh in engagement with the perimeter extending supports and to extend over the intake opening.

21. An assembly for installing a covering over an air intake opening in engagement with a surrounding perimeter extending face, comprising:
 a plurality of elongated supports attached to the perimeter extending face around the intake opening, each of said supports exhibiting a forwardly projecting support surface within which is configured a slot;
 a plurality of fasteners installable through an accessible end location of each support such that a base of each fastener is retained within and traversable along an interior channel communicable with said slot and defined in said support, a projecting portion of each fastener extending from said base and forwardly through said slot;
 a rigid member including any of a metal, plastic coated metal, plastic, rigid nylon, fiberglass or other molded material overlaying said elongated supports, said rigid member exhibiting an intersecting grid pattern defining a plurality of apertures distributed across a surface area of said rigid member, said projecting portions of said fasteners extending through selected ones of said apertures to retain said rigid member against said elongated supports; and
 a filter screen overlaying said rigid planar member and including a plurality of perimeter defined apertures for receiving said projecting portions of said fasteners, a plurality of twist caps having interiorly threaded shaft ends threadably engaging said fasteners to affix the screen against said rigid planar member over the intake opening.

* * * * *